(12) United States Patent
Ikeda et al.

(10) Patent No.: US 8,290,609 B2
(45) Date of Patent: Oct. 16, 2012

(54) PRODUCTION MANAGEMENT SYSTEM AND PRODUCTION MANAGEMENT METHOD APPLIED TO OPTICAL DISPLAY DEVICE PRODUCTION SYSTEM

(75) Inventors: Yoshinori Ikeda, Ibaraki (JP); Tamotsu Oda, Ibaraki (JP); Kazuo Kitada, Ibaraki (JP); Tomokazu Yura, Ibaraki (JP); Satoru Koshio, Ibaraki (JP); Takuya Nakazono, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 500 days.

(21) Appl. No.: 12/431,087

(22) Filed: Apr. 28, 2009

(65) Prior Publication Data
US 2009/0280711 A1 Nov. 12, 2009

(30) Foreign Application Priority Data

May 7, 2008 (JP) .................................. 2008-121404
Apr. 14, 2009 (JP) .................................. 2009-098258

(51) Int. Cl.
*G06F 19/00* (2011.01)
*H01J 9/20* (2006.01)
*H01J 9/42* (2006.01)

(52) U.S. Cl. ........................... 700/122; 700/117; 445/24

(58) Field of Classification Search .................. 700/108, 700/109, 110, 117, 122, 174, 175; 702/35, 702/36, 81, 82, 83, 84, 182, 183; 445/3, 445/24, 66; 156/60, 64, 510; 349/187, 192
See application file for complete search history.

(56) References Cited

U.S. PATENT DOCUMENTS

| 6,889,738 | B2 * | 5/2005 | Yamamoto et al. | 156/353 |
|---|---|---|---|---|
| 7,195,682 | B2 * | 3/2007 | Yamamoto et al. | 156/64 |
| 7,450,213 | B2 * | 11/2008 | Kim et al. | 349/187 |
| 7,471,380 | B2 * | 12/2008 | Kishioka | 349/191 |
| 7,492,081 | B2 * | 2/2009 | Hori et al. | 445/24 |
| 7,908,026 | B2 * | 3/2011 | Ohashi | 700/122 |
| 2004/0069397 | A1 * | 4/2004 | Yamamoto et al. | 156/64 |
| 2005/0098254 | A1 * | 5/2005 | Yamamoto et al. | 156/64 |
| 2006/0138956 | A1 * | 6/2006 | Hori et al. | 313/582 |
| 2008/0002137 | A1 * | 1/2008 | Kim et al. | 349/187 |
| 2008/0087149 | A1 * | 4/2008 | Ohashi | 702/81 |
| 2008/0088790 | A1 * | 4/2008 | Ohashi | 349/192 |

FOREIGN PATENT DOCUMENTS

| EP | 1962258 A1 | 8/2008 |
|---|---|---|
| JP | 2007-140046 A | 6/2007 |

* cited by examiner

*Primary Examiner* — Charles Kasenge
(74) *Attorney, Agent, or Firm* — Westerman, Hattori, Daniels & Adrian, LLP

(57) ABSTRACT

The invention provides a production management system and a production management method which are applied to an optical display device production system which can more precisely carry out a production management. A memory stores a panel information allocated per an optical display unit, and a roll information including a positional information of optical films in a material roll before the optical films bonded to the optical display unit are cut so as to coordinate. A position in the material roll before the optical films bonded to the optical display unit are cut is specified based on the panel information corresponding to the optical display unit of the optical display device determined by an inspecting apparatus that a defect exists, and the roll information coordinated to the panel information. If it is possible to recognize what position in what material roll the defect exists, as mentioned above, it is possible to carry out a production management more precisely.

8 Claims, 8 Drawing Sheets

PRODUCTION MANAGEMENT SYSTEM AND PRODUCTION MANAGEMENT METHOD APPLIED TO OPTICAL DISPLAY DEVICE PRODUCTION SYSTEM

BACKGROUND OF THE INVENTION

1. Field of the Invention

The invention relates to a production management system and a production management method which are applied to an optical display device production system for producing an optical display device by unwinding an optical film from a material roll formed by winding the optical film therearound as a roll shape, and cutting to a predetermined size so as to bond to an optical display unit.

2. Description of the Related Art

A production method of an optical display device mounted to a conventional liquid crystal display device is conceptually shown in FIG. 8. First, in an optical film maker, a step produces along (web-like) sheet material having an optical film as a material roll (#1). The concrete production step is a known production step, and a description thereof will not be given. As the "long (web-like) sheet material", for example, there are a polarizing plate material, a retardation plate material, a laminated film material of the polarizing plate and the retardation plate, and the like which are used in a liquid crystal display device. Next, the material roll is slit to a predetermined size (a size in accordance with a size of the optical display unit) (#2). Next, the slit long material is cut to a fixed size in conformity to a size of the optical display unit (#3). Next, a step inspects an outer appearance of a piece of sheet material (an optical film) cut to the fixed size (#4). As the inspecting method, for example, there can be listed up a defect inspection in accordance with a visual observation, and an inspection using a known defect inspection apparatus. The defect means, for example, a dirty in a front face or an internal portion, a scratch, a special twisted defect like a hitting mark generated by biting a contaminant (which may be called as a knick), an air bubble, a contaminant or the like. Next, a step inspects a finished product (#5). The finished product inspection is an inspection in accordance with a quality standard having a severer non-defective determination than the outer appearance inspection. Next, a step works end faces in four sides of the sheet material of the piece of sheet material (#6). This step is carried out for preventing an adhesive or the like from running over from the end faces during transport. Next, a step cleanly packages the piece of sheet material under a clean room environment (#7). Next, a step packages for transport (a transport package) (#8). The piece of sheet material is produced as mentioned above, and is transported to a panel processing manufacturer.

In the panel processing manufacturer, a step dismounts the package of the piece of sheet material transported (#11). Next, a step inspects an outer appearance for inspecting the scratch, the dirt and the like generated at a time of transporting or dismounting the package (#12). The piece of sheet material which is determined as the non-defective by the inspection is fed to the next step. There is a case that the outer appearance inspection is omitted. An optical display unit (for example, a glass substrate unit in which a liquid crystal cell is enclosed) to which the piece of sheet material is bonded is previously produced, and the optical display unit is cleaned before the bonding step (#13).

A step bonds the piece of sheet material and the optical display unit (#14). A release film is peeled off from the piece of sheet material while leaving a pressure-sensitive adhesive layer, and it is bonded to one face of the optical display unit by using the pressure-sensitive adhesive layer as a bonding face. Further, it can be bonded to the other face of the optical display unit in the same manner. In the case of bonding to both the faces, the structure may be made such that the optical films having the same construction are bonded to the faces of the optical display unit, or the structure may be made such that the optical films having different constructions are bonded thereto. Next, a step carries out an inspection of the optical display device in the state in which the optical film is bonded and a defect inspection (#15). The optical display device which is determined as the non-defective in this inspection is fed to a mounting process (#16). On the other hand, a reworking process is applied to the optical display device which is determined as a defective (#17). In the reworking process, the optical film is peeled off from the optical display unit. The optical film is newly bonded to the reworked optical display unit (#14).

In the production step mentioned above, since the optical film maker and the panel processing manufacturer exist in the separate places, the end face working, the packaging of the piece of sheet material, the package dismounting and the like are particularly necessary steps. However, there are a problem of a production cost increase caused by multiple steps, a problem of the scratch, the dust, the dirt and the like generated by the multiple steps and the transport, a necessity of the inspection step caused thereby, and a problem that it is necessary to store and manage many kinds of sheet materials as a stock.

As a method of solving the problems, there has been proposed Japanese Patent Application Laid-Open (JP-A) No. 2007-140046. In accordance with this invention, the structure is provided with a supply portion pulling out and supplying a long sheet material from a material roll around which the long sheet material having an optical film corresponding to a member of an optical display device is wound, a detection portion detecting a defect of the long sheet material pulled out by the supply portion, a cutting work portion cutting the long sheet material based on a result of detection of the detection portion and working to an individual sheet material, a transfer portion transferring the sheet material cut by the cutting work portion for a bonding work, and a bonding work portion bonding the sheet material transferred by the transfer portion and an optical display unit corresponding to a member of an optical display device, and these portion are arranged on a continuous production line. In the structure mentioned above, it is possible to directly cut the long sheet material having the optical film into a desired size, and to bond the cut sheet material to the optical display unit. Accordingly, it is possible to directly package the long sheet material wound around the material roll so as to deliver, in place of the conventional step which stamps the long sheet material, tightly packages the stamped sheet material, and delivers to the panel processing manufacturer.

SUMMARY OF THE INVENTION

In the conventional method of cutting the optical film to the fixed size in conformity to the size of the optical display unit in the optical film maker side, packaging so as to transport to the panel processing manufacturer, and thereafter bonding the optical film to each of the optical display units in the panel processing manufacturer side, it is impossible to recognize which material roll each of the delivered optical films is cut from, in the panel processing manufacturer side. On the contrary, in the case that the optical film is delivered as the material roll from the optical film maker to the panel processing manufacturer, such as Japanese Patent Application Laid- Open (JP-A) No. 2007-140046, it is possible to specify the material roll before the optical film is cut, even in the case that it is determined that the defect exists in the optical film, at a time of inspecting each of the optical display devices to which the optical film is bonded. Accordingly, it is possible to recognize which material roll the defect exists in.

However, in accordance with the method as mentioned above, it is possible to specify which material roll the defect exists in, however, it is impossible to recognize the position of the defect in the material roll. Accordingly, there is a problem that even in the case that the optical film maker receives the information relating to the material roll having the defect from the panel processing manufacturer, it is impossible to sufficiently precisely the production management of the material roll in accordance with the information.

The present invention is made by taking the actual condition mentioned above into consideration, and an object of the present invention is to provide a production management system and a production management method which are applied to an optical display device production system which can more precisely carry out a production management.

As a result of devoting themselves to make a study for solving the problem mentioned above, the inventors run into a completion of the present invention mentioned below.

A production management system according to a first aspect of the present invention relates to a production management system applied to an optical display device production system for producing an optical display device by unwinding an optical film from a material roll formed by winding the optical film in a roll shape, and cutting into a predetermined size so as to bond to an optical display unit, comprising:

a material roll production management apparatus managing a production of the material roll; and an optical display device production management apparatus managing a production of the optical display device in the optical display device production system, wherein the optical display device production management apparatus includes:

an information storage portion storing a panel information allocated per the optical display unit, and a roll information including a positional information of the optical film in the material roll before the optical film bonded to the optical display unit is cut so as to coordinate; and a position specifying portion specifying a position in the material roll before the optical film of the optical display device is cut, based on a result of inspection of the optical display device in which the optical films are bonded with the optical display device production system, the panel information and the roll information.

In accordance with this structure, it is possible to recognize what position in which material roll the defect exists at, based on the result of inspection of the optical display device to which the optical film is bonded, the panel information and the roll information. In other words, since the panel information and the roll information are stored in the coordinating manner, it is possible to specify the position in the material roll before the optical film bonded to the optical display unit is cut, based on the panel information corresponding to the optical display unit of the optical display device which is determined based on the inspection that the defect exists, and the roll information coordinated to the panel information. As mentioned above, if it is possible to recognize what position in which material roll the defect exists at, it is possible to more precisely carry out the production management. In this case, it is possible to recognize a position having no defect in the material roll, based on the result of inspection mentioned above, the panel information and the roll information.

The production management system according to a second aspect of the present invention relates to the production management system applied to an optical display device production system, wherein the material roll production management apparatus has a defect information transmitting portion transmitting a defect information including a positional information of a defect in the produced material roll to the optical display device production management apparatus.

In accordance with this structure, it is possible to collate the defect information of the material roll transmitted to the optical display device production management apparatus from the material roll production management apparatus, with the position of the defect specified based on the result of inspection, the panel information and the roll information. Accordingly, it is possible to more precisely carry out the production management by collating the defect inspection at a time of producing the material roll, with the defect inspection of the optical display device to which the optical film is bonded.

The production management system according to a third aspect of the present invention relates to the production management system applied to an optical display device production system, wherein the optical display device production management apparatus has a roll information transmitting portion transmitting a roll information stored in the information storage portion to the material roll production management apparatus based on the result of inspection.

In accordance with this structure, since the roll information is transmitted to the material roll production management apparatus from the optical display device production management apparatus, based on the result of inspection mentioned above, it is possible to recognize which material roll the defect exists in, in the material roll production management apparatus. Accordingly, since the material roll production management apparatus manages the production of the material roll based on the received roll information, whereby it is possible to efficiently exclude the defect from the produced material roll, it is possible to improve a yield of the material roll.

The production management system according to a fourth aspect of the present invention relates to the production management system applied to an optical display device production system, wherein the optical display device production management apparatus has a yield information transmitting portion transmitting a yield information of the optical display device produced by the optical display device production system to the material roll production management apparatus.

In accordance with this structure, it is possible to recognize an influence which the defect included in the material roll gives to the yield of the optical display device, in the material roll production management apparatus, based on the yield information of the optical display device transmitted to the material roll production management apparatus from the optical display device production apparatus. Accordingly, since the material roll production management apparatus can manage the defect inspection at a time of producing the material roll, based on the yield information of the optical display device received from the optical display device production apparatus, it is possible to more precisely carry out the production management.

A production management method according to a fifth aspect of the present invention relates to a production management method applied to an optical display device production system for producing an optical display device by unwinding an optical film from a material roll formed by winding the optical film in a roll shape, and cutting into a predetermined size so as to bond to an optical display unit, comprising: an information storing step in which an optical display device production management apparatus managing a production of the optical display device in the optical display device production system stores a panel information allocated per the optical display unit, and a roll information including a positional information of the optical film in the material roll before the optical film bonded to the optical display unit is cut so as to coordinate; and a position specifying step in which the optical display device production management apparatus specifies a position in the material roll before the optical film of the optical display device is cut, based on a result of inspection of the optical display device in which the optical films are bonded with the optical display device production system, the panel information and the roll information.

In accordance with this structure, a production management method having effects similar to the production management system according to the first aspect of the present invention is provided.

The production management method according to a sixth aspect of the present invention relates to the production management method applied to an optical display device production system, comprising: a defect information transmitting step in which the material roll production management apparatus managing the production of the material roll transmits a defect information including a positional information of a defect in the produced material roll to the optical display device production management apparatus.

In accordance with this structure, a production management method having effects similar to the production management system according to the second aspect of the present invention is provided.

The production management method according to a seventh aspect of the present invention relates to the production management method applied to an optical display device production system, comprising:

a roll information transmitting step in which the optical display device production management apparatus transmits a roll information stored in the information storing step to the material roll production management apparatus based on the result of inspection.

In accordance with this structure, a production management method having effects similar to the production management system according to the third aspect of the present invention is provided.

The production management method according to a eighth aspect of the present invention relates to the production management method applied to an optical display device production system, comprising:

a yield information transmitting step in which the optical display device production management apparatus transmits a yield information of the optical display device produced by the optical display device production system to the material roll production management apparatus.

In accordance with this structure, a production management method having effects similar to the production management system according to the fourth aspect of the present invention is provided.

DETAILED DESCRIPTION OF THE PREFERRED EMBODIMENTS

First Embodiment

Figure 1:
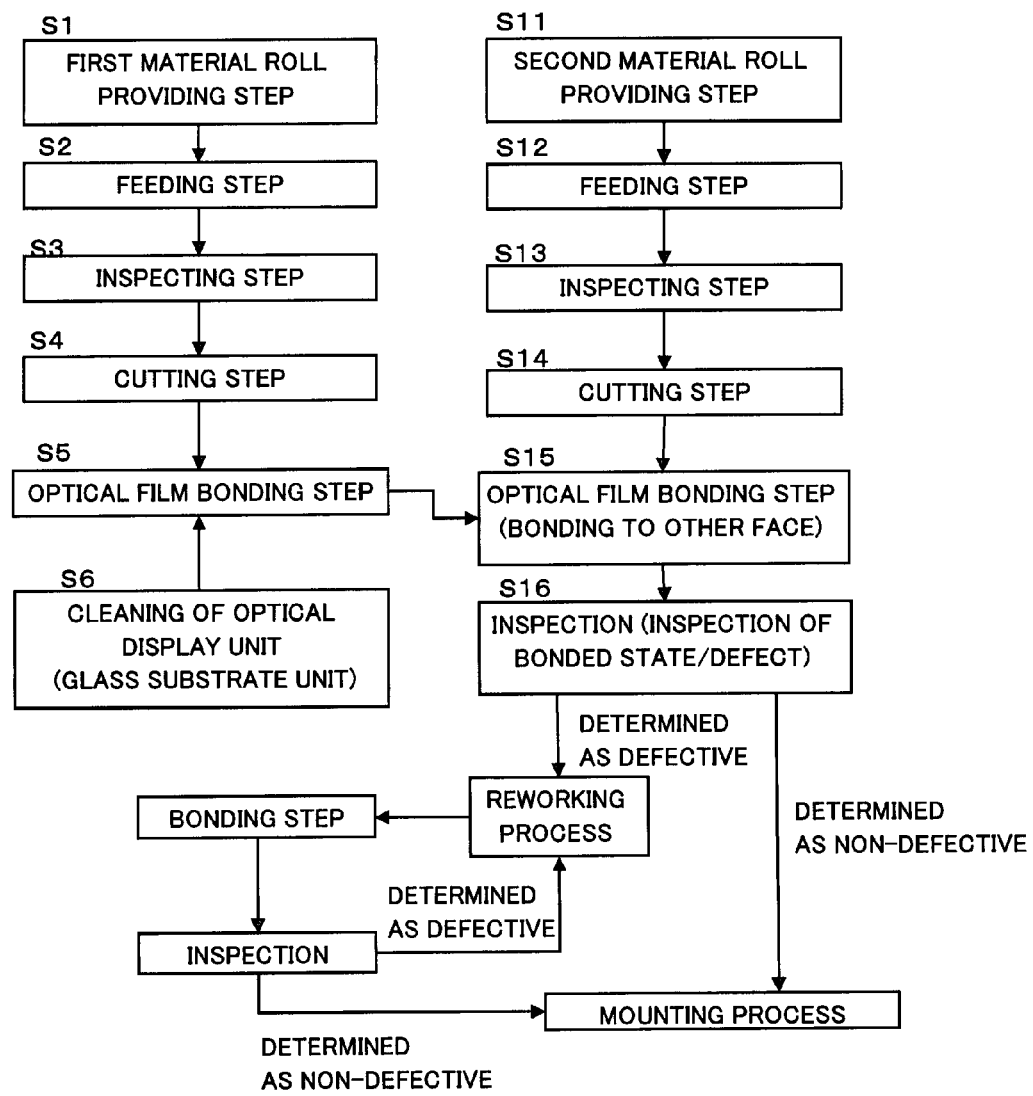
FIG. 1 is a flow chart of a production method of an optical display device in accordance with a first embodiment.

A description will be given below of a first embodiment in accordance with the present invention. FIG. 1 shows a flow chart of a production method of an optical display device in accordance with the first embodiment. A production system in accordance with the first embodiment corresponds to a construction example which is not provided with first and second pre-inspection peeling apparatuses, and first and second release film laminating apparatuses in a structure of a production system in accordance with a second embodiment mentioned below. Further, a construction which is not provided with first and second defect inspection apparatuses, can be exemplified as the other embodiment of the production system in accordance with the first embodiment.

(Optical Display Unit)

First, for example, a glass substrate unit of a liquid crystal cell, an organic electroluminescent (EL) light-emitting unit and the like can be listed up, as an optical display unit used in the present invention.

(Optical Film)

A polarizer film, a retardation film, a viewing angle compensating film, a brightness enhancement film, a laminated film configured by a combination of two or more these films can be exemplified as an optical film bonded to the optical display unit. There is a case that a transparent film for protecting is laminated to a front face of the optical film. Further, an pressure-sensitive adhesive layer is formed on one front face of the optical film, in such a manner as to be bonded to the optical display unit, and are lease film for protecting the pressure-sensitive adhesive layer is provided thereon. Further, a surface protecting film is provided on the other surface of the optical film via the pressure-sensitive adhesive layer. A specific structure of these films will be mentioned below. In the following description, the optical film to which the surface protecting film and the release film are laminated may be called as a sheet material.

(Production Flow Chart)

Figure 3:
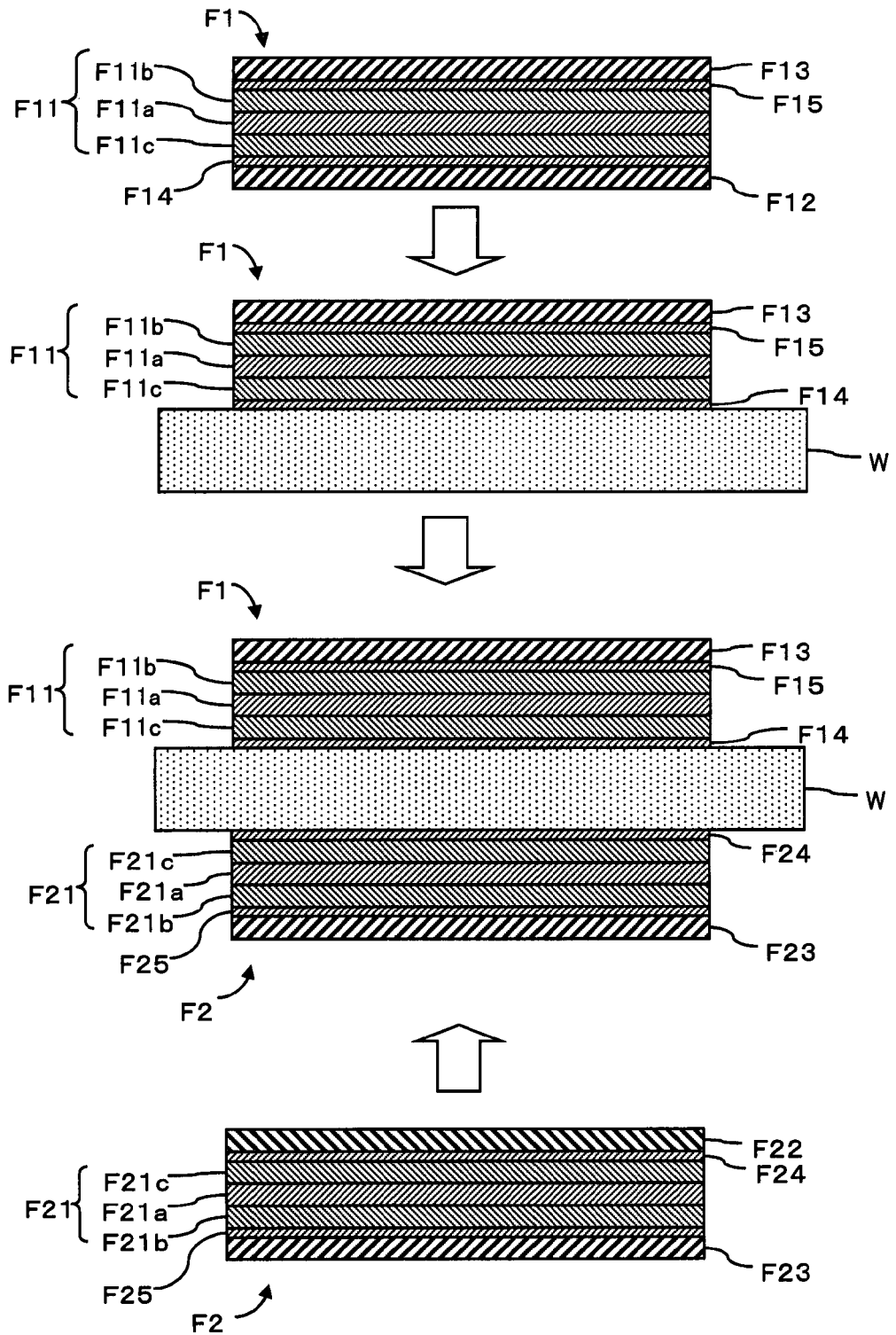
FIG. 3 is a view for explaining an example of a laminated structure of first and second optical films.

(1) First Material Roll Providing Step (S1 in FIG. 1). A long first sheet material is provided as a first material roll. A width of the first material roll depends on a bonding size of the optical display unit. As shown in FIG. 3, a lamination structure of a first sheet material F1 has a first optical film F11, a first release film F12 and a surface protecting film F13. The first optical film F11 is configured by a first polarizer F11a, a first film F11b provided on one face via an adhesive layer (not shown), and a second film F11c provided on the other face via the adhesive layer (not shown).

The first and second films F11b and F11c are configured, for example, by a polarizer protecting film (for example, a tri-acetyl cellulose film, a PET film or the like). The second film F11c is bonded to the optical display unit face side via a first pressure-sensitive adhesive layer F14. A surface treatment can be applied to the first film F11b. As the surface treatment, for example, there can be listed up a hard coating, a anti-reflection treatment, a treatment aiming at a prevention of a sticking, a diffusion and an anti-glare, and the like. The first release film F12 is provided via the second film F11c and the first pressure-sensitive adhesive layer F14. Further, the surface protecting film F13 is provided via the first film F11b and the pressure-sensitive adhesive layer F15. In the following description, there is a case that the laminated structure of the polarizer and the polarizer protecting film is called as the polarizing plate.

Each of the following steps is carried out within an isolating construction which is isolated in a factory, and a cleanliness factor is maintained. It is particularly preferable that the cleanliness factor is maintained in a bonding step bonding the optical film to the optical display unit.

(2) Feeding Step (S2 in FIG. 1). The first sheet material F1 is unwound from the provided and placed first material roll, and is fed to a downstream side.

(3) First Inspection Step (S3 in FIG. 1). A defect of the first sheet material F1 is inspected by using a first defect inspection apparatus. As a defect inspection method in this case, there can be listed up a method of performing imaging and image processing generated by a transmitted light and a reflected light with respect to both faces of the first sheet material F1, a method of performing imaging and image processing by arranging a polarization film for inspection between a CCD camera and a subject to be inspected, in such a manner as to form crossed nicols relation (which may be called as 0 degree cross) to a polarization axis of the polarization plate corresponding to the subject to be inspected, and a method of performing imaging and image processing by arranging a polarization film for inspection between a CCD camera and a subject to be inspected, in such a manner as to form a predetermined angle (for example, in a range larger than 0 degree and less than 10 degree) (which may be called as x degree cross) to a polarization axis of the polarization plate corresponding to the subject to be inspected. In this case, a known method can be applied to an algorithm of the image processing, for example, the defect can be detected by grayscale determination in accordance with a binarization processing.

In the performing imaging and image processing method by the transmitted light, it is possible to detect a contaminant in an inner portion of the first sheet material F1. In the performing imaging and image processing method by the reflected light, it is possible to detect a contaminant attached to the front face of the first sheet material F1. In the performing imaging and image processing method by the 0 degree cross, it is possible to mainly detect a contaminant on the front face, a dirty, a contaminant in an inner portion and the like as a bright spot. In the performing imaging and image processing method by the x degree cross, it is possible to mainly detect a knick.

The information of the defect obtained by the first defect inspection apparatus is associated with its positional information (for example, a position coordinate), is transmitted to a controller, and can contribute to a cutting method by a first cutting apparatus mentioned below.

(4) First Cutting Step (S4 in FIG. 1). The first cutting apparatus cuts the surface protection film F13, the pressure-sensitive adhesive layer F15, the first optical film F11 and the first pressure-sensitive adhesive layer F14 to a predetermined size without cutting the first release film F12. As the cutting portion, for example, there can be listed up a laser, a cutter, and the other known cutting portion. The structure is made such as to cut so as to avoid the defect, based on the information of the defect obtained by the first defect inspection apparatus. Accordingly, a yield of the first sheet material F1 is widely improved. The first sheet material F1 including the defect is excluded by a first rejection apparatus mentioned below, and is structured such as not to be attached to an optical display unit W.

(5) First Optical Film Bonding Step (S5 in FIG. 1). The first optical film F11 from which the first release film F12 is removed is bonded to the optical display unit W via the first pressure-sensitive adhesive layer F by using a first bonding apparatus 18 while removing the first release film F12 by using the first peeling apparatus. At a time of the bonding, the first optical film F11 and the optical display unit W are pinched by roll pairs so as to be crimped, as mentioned below.

(6) Cleaning Step (S6 in FIG. 1). The optical display unit W is cleaned its front face in accordance with a polishing cleaning, a water cleaning or the like. The cleaned optical display unit W is fed to the first bonding apparatus.

It is preferable that the first material roll providing step, the first inspecting step, the first cutting step, the first optical film bonding step and the cleaning step are set to a continuous production line. The first optical film F11 is bonded to one face of the optical display unit W through a series of production steps mentioned above. In the following description, a description will be given below of a production steps bonding the second optical film F21 to the other face.

(7) Second Material Roll Providing Step (S11 in FIG. 1). The long second sheet material F2 is provided as the second material roll. As shown in FIG. 3, a laminated structure of the second sheet material F2 is the same structure as the first sheet material, however, is not limited to this The second sheet material F2 has the second optical film F21, a second release film F22, and a surface protecting film F23. The second optical film F21 is configured by a second polarizer 21a, a third film F21b provided on one face thereof via an adhesive layer (not shown), and a fourth film F21c provided on the other face thereof via an adhesive layer (not shown).

The third and fourth films F21b and F21c are configured, for example, by a polarizer protecting film (for example, a tri-acetyl cellulose film, a PET film or the like). The fourth film F21c is bonded to the optical display unit face side via a second pressure-sensitive adhesive layer F24. A surface treatment can be applied to the third film F21b. As the surface treatment, for example, there can be listed up a hard coat treatment, a reflection preventing treatment, a treatment aiming at a prevention of a sticking, a diffusion and an anti-glare, and the like. The second release film F22 is provided via the fourth film F21c and the second pressure-sensitive adhesive layer F24. Further, the surface protecting film F23 is provided via the third film F21b and the pressure-sensitive adhesive layer F25.

(8) Feeding Step (S12 in FIG. 1). The second sheet material F2 is unwound from the provided and placed second material roll, and is fed to a downstream side.

(9) Second Inspecting Step (S13 in FIG. 1). A defect of the second sheet material F2 is inspected by using a second defect inspection apparatus. The defect inspecting method in this case is the same as the method by the first defect inspection apparatus mentioned above.

(10) Second Cutting Step (S14 in FIG. 1). A second cutting apparatus cuts the surface protecting film F23, the pressure-sensitive adhesive layer F25, the second optical film F21 and the second pressure-sensitive adhesive layer F24 into a predetermined size without cutting the second release film F22. As the cutting portion, for example, there can be listed up a laser, a cutter, the other known cutting portion and the like. The structure is made such as to cut so as to avoid the defect, based on the information of the defect obtained by the second defect inspection apparatus. Accordingly, a yield of the second sheet material F2 is widely improved. The second sheet material F2 including the defect is excluded by a second rejection apparatus mentioned below, and is structured such as not to be attached to the optical display unit W.

(11) Second Optical Film Bonding Step (S15 in FIG. 1). Next, after the second cutting step, the second optical film F21 from which the second release film F22 is removed is bonded to a different face from the face to which the first optical film F11 of the optical display unit W is bonded, via the second pressure-sensitive adhesive layer F24 by using a second bonding apparatus while removing the second release film F22 by using the second peeling apparatus. In this case, there is a case that the optical display unit W is rotated at 90 degree by a feed direction switching mechanism of a feed mechanism before bonding the second optical film F21 to the optical display unit W, thereby making the first optical film F11 and the second optical film F21 in a relation of crossed nicols. At a time of the bonding, the second optical film F21 and the optical display unit W are pinched by rolls so as to be crimped, as mentioned below.

(12) Inspecting Step of Optical Display Device (S16 in FIG. 1). The inspecting apparatus detects the optical display device in which the optical film is bonded to both the faces of the optical display unit W. As an inspecting method, there can be exemplified a method of performing imaging and image processing by the reflected light with respect to both the faces of the optical display device. Further, as the other method, there can be listed up a method of using the polarization film for inspecting placed between the CCD camera and the subject to be inspected. In this case, a known method can be applied to an algorithm of the image processing, and it is possible to detect the defect, for example, by grayscale determination in accordance with a binarization processing.

(13) A non-defective of the optical display device is determined based on the information of the defect obtained by the inspecting apparatus 30. The optical display device determined as the non-defective is fed to the next mounting process. In the case that a defective is determined, a reworking process is applied, and the optical film is bonded newly, and is next inspected. In the case that the non-defective is determined, the process gives way to the mounting process, and in the case that the defective is determined, the process again gives way to the reworking process or the defective is put on the shelf.

In a series of production steps mentioned above, it is possible to suitably produce the optical display device by setting the bonding step of the first optical film F11 and the bonding step of the second optical film F21 to the continuous production line.

(Skip Cut Method)

In the present embodiment, it is possible to cut the first sheet material F1 or the second sheet material F2 in such a manner as to avoid the defect based on the defect information input so as to coordinate to the first material roll or the second material roll at a time of delivering the first sheet material F1 or the second sheet material F2, as well as it is possible to cut the first sheet material F1 or the second sheet material F2 in such a manner as to avoid the defect based on the defect information obtained by the first inspecting apparatus or the second inspecting apparatus as mentioned above. For example, there is a case that the defect information (the defect coordinate, the kind of the defect, the size or the like) of the first and second sheet materials is attached as a code information (for example, a QR code and a bar code) to one end portion in a width direction of the first and second material rolls at a predetermined pitch unit (for example, 1000 mm). In the case mentioned above, the step reads the cord information in a preliminary stage of the cutting, and cuts into a predetermined size in the first and second cutting steps in such a manner as to avoid the defect portion based on the analysis (which may be called as a skip cut). Further, the portion including the defect is structured such as to be removed or be bonded to the other member than the optical display unit, and the piece of sheet material which is cut into the predetermined size and is determined as the non-defective is structured such as to be bonded to the optical display unit. Accordingly, a yield of the optical films F11 and F21 is widely improved.

The defect information mentioned above includes at least a positional information in the material roll of the defect which the material roll has. The positional information may be constituted, for example, by a two-dimensional positional information which is expressed by a position coordinate having coordinate axes in a width direction and a length direction which are orthogonal to each other in the material roll, or may be constituted by a one-dimensional positional information expressed only by a position coordinate in the length direction of the material roll. In the case that the skip cut is carried out based on only the defect information input so as to coordinate to the delivered first material roll or second material roll, the defect inspection by the first inspecting apparatus or the second inspecting apparatus may be omitted.

Second Embodiment

Figure 2:
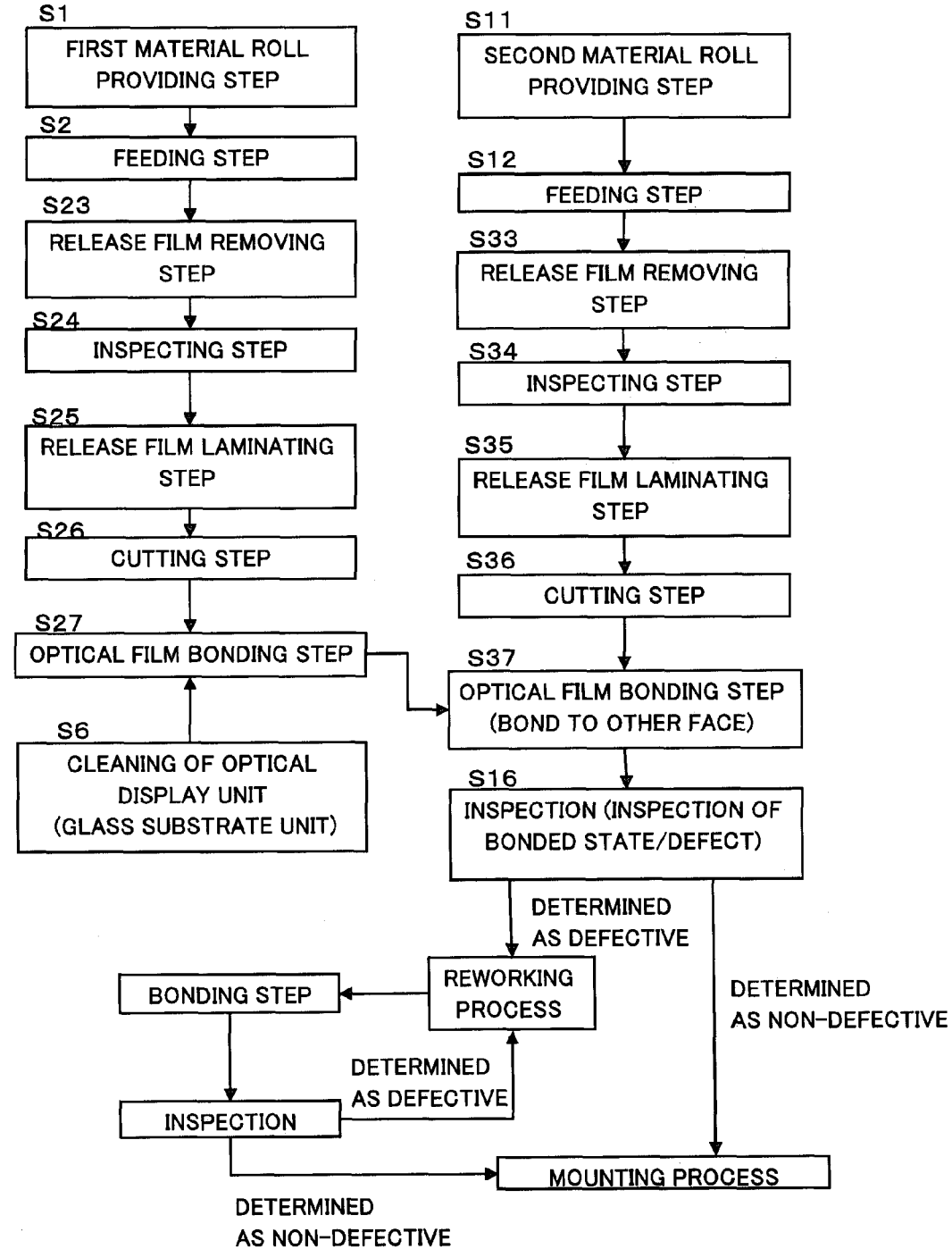
FIG. 2 is a flow chart of a production method of an optical display device in accordance with a second embodiment.

A description will be given below of the second embodiment in accordance with the present invention. FIG. 2 shows a flow chart of a production method of an optical display device in accordance with the second embodiment. The same steps as those of the first embodiment will be described briefly.

(1) First Material Roll Providing Step (S1 in FIG. 2). A long first sheet material F1 is provided as a first material roll. A lamination structure of a first sheet material F1 is the same as that of the first embodiment shown in FIG. 3.

(2) Feeding Step (S2 in FIG. 2). The first sheet material F1 is unwound from the provided and placed first material roll, and is fed to a downstream side.

(3) Release Film Removing Step (S23 in FIG. 2). A first pre-inspection peeling apparatus peels off the first release film F12 from the fed first sheet material F1. Details of the peeling mechanism will be mentioned below.

(4) First Inspecting Step (S24 in FIG. 2). The first inspecting apparatus inspects the defect of the first sheet material F1 after the release film removing step. The defect inspection of the first optical film F11 can be carried out without necessity for taking into consideration a retardation which is underlying in the release film F12. A method of inspecting the defect is as mentioned above. The first sheet material F1 including the defect is excluded by a first rejection apparatus mentioned below, and is structured such as not to be attached to the optical display unit W.

(5) Release Film Laminating Step (S25 in FIG. 2). A first release film laminating apparatus laminates the first release film F12 to the first optical film F11 via the first pressure-sensitive adhesive layer F14 after the first inspecting step. It is preferable for maintaining a distortion of track to carry out the lamination in such a manner as to prevent a foam entrapment such as an air bubble at a time of laminating. Details of the first release film laminating apparatus will be mentioned below.

(6) First Cutting Step (S26 in FIG. 2). Next, a first cutting apparatus cuts the surface protecting film F13, the pressure-sensitive adhesive layer F15, the first optical film F11 and the first pressure-sensitive adhesive layer F14 into a predetermine size without cutting the first release film F12 after the release film laminating step. As the cutting portion, for example, there can be listed up a laser, a cutter, the other known cutting portion and the like.

(7) First Optical Film Bonding Step (S27 in FIG. 2). Next, a first peeling apparatus peels off the first release film F12 after the first cutting step. The first bonding apparatus bonds the first optical film F11 from which the first release film F12 is peeled off to the optical display unit W via the first pressure-sensitive adhesive layer F14. At a time of bonding, the first optical film F11 and the optical display unit W are pinched by rolls so as to be crimped, as mentioned below.

(8) Cleaning Step of Optical Display Unit (S6 in FIG. 2). This is the same step as mentioned above.

(9) Second Material Roll Providing Step (S11 in FIG. 2). The long second sheet material F2 is provided as a second material roll. A laminated structure of the second sheet material F2 is a structure shown in FIG. 3.

(10) Feeding Step (S12 in FIG. 2). The second sheet material F2 is unwound from the provided and placed second material roll, and is fed to a downstream side.

(11) Release Film Removing Step (S33 in FIG. 2). A second pre-inspection peeling apparatus peels off the second release film F22 from the fed second sheet material F2. Details of the peeling mechanism will be mentioned below.

(12) Second Inspecting Step (S34 in FIG. 2). A second inspecting apparatus inspects a defect of the second sheet material F2 after the release film removing step. It is possible to carry out a defect inspection of the second optical film F21 without necessity for taking into consideration a retardation which is underlying in the release film F22. A method of inspecting the defect is as mentioned above. The second sheet material F2 including the defect is excluded by a second rejection apparatus mentioned below, and is structured such as not to be laminated to the optical display unit.

(13) Release Film Laminating Step (S35 in FIG. 2). A second release film laminating apparatus laminates the second release film F22 to the second optical film F21 via the second pressure-sensitive adhesive layer F24 after the second inspecting step. It is preferable for maintaining a distortion of track to carry out the lamination in such a manner as to prevent a foam entrapment such as an air bubble at a time of laminating. Details of the second release film laminating apparatus will be mentioned below.

(14) Second Cutting Step (S36 in FIG. 2). Next, a second cutting apparatus cuts the surface protecting film F23, the pressure-sensitive adhesive layer F25, the second optical film F21 and the second pressure-sensitive adhesive layer F24 into a predetermine size without cutting the second release film F22 after the release film laminating step. As the cutting portion, for example, there can be listed up a laser, a cutter, the other known cutting portion and the like.

(15) Second Optical Film Bonding Step (S37 in FIG. 2). Next, a second peeling apparatus peels off the second release film F22 after the second cutting step. The second bonding apparatus bonds the second optical film F21 from which the second release film F22 is peeled off to a different face from the face to which the first optical film F11 of the optical display unit W is bonded, via the second pressure-sensitive adhesive layer F24. In this case, there is a case that the first optical film F11 and the second optical film F21 are set to crossed nicols relation by rotating the optical display unit W at 90 degree, before bonding the second optical film F21 to the optical display unit W. At a time of bonding, the second optical film F21 and the optical display unit W are pinched by rolls so as to be crimped, as mentioned below. In accordance with the above steps, the first optical film F11 is bonded to one face of the optical display unit W, and the second optical film F21 is bonded to the other face, so that it is possible to product the optical display device in which the optical films are provided in both faces.

(16) Inspecting Step of Optical Display Device (S16 in FIG. 2). This step is the same as mentioned above.

(17) The optical display device is determined whether or not it is a non-defective, based on the information of the defect obtained by the inspecting apparatus. The optical display device determined as the non-defective is fed to the next mounting process. In the case that the defective is determined, the reworking process is applied, the optical film is newly attached, and the inspection is carried out. In the case that a non-defective is determined, the process gives way to the mounting process, and in the case that a defective is determined, the process again gives way to the reworking process or the defective is put on the shelf.

In a series of production steps mentioned above, it is possible to suitably produce the optical display device by executing the bonding step of the first optical film F11 and the bonding step of the second optical film F21 in the continuous production line. Particularly, it is possible to bond the optical film to the optical display unit under an environment in which a cleanliness factor is secured, by carrying out each of the processed in an inner portion of an isolating construction which is isolated from the factory, whereby it is possible to produce the optical display device having a high quality.

In the present embodiment, in the same manner as the first embodiment, the structure is made such that it is possible to skip cut the first sheet material F1 or the second sheet material F2 in such a manner as to avoid the defect, based on the defect information input so as to coordinate to the first material roll or the second material roll at a time of delivering the first sheet material F1 or the second sheet material F2. This embodiment is the same as the case of the first embodiment in a point that it is possible to omit the defect inspection by the first inspecting apparatus 14 or the second inspecting apparatus 24, in the case that the skip cut is carried out based on only the defect information input so as to coordinate to the delivered first material roll or second material roll. In the case that the defect inspection by the first inspecting apparatus 14 is omitted, the processes by the first pre-inspection peeling apparatus 13 and the first release film laminating apparatus 15 are not necessary, and in the case that the defect inspection by the second inspecting apparatus 24 is omitted, the processes by the second pre-inspection peeling apparatus 23 and the second release film laminating apparatus 25 are not necessary.

(Preferable Production System Achieving Production Methods of First and Second Embodiments)

A description will be given below of an example of a preferable production system which achieves the production method in accordance with the second embodiment.

Various apparatuses achieving the production method in accordance with the second embodiment are isolated from an external portion by the isolating construction. An internal portion surrounded by the isolating construction is kept clean in comparison with the external portion. The isolating construction is configured by a transparent material wall and a frame construction. A blower apparatus is installed in a ceiling of the isolating construction. The blower apparatus is provided with a HEPA filter, and sends air having a high cleanliness factor to the internal portion of the partition wall construction. A lower portion of a wall surface of the partition wall construction is provided with an air discharge opening portion for discharging the internal air to the external portion. Further, a filter may be provided in an opening surface for preventing an intruding material from the external portion. It is possible to maintain a whole of the production system in a clean environment by the partition wall construction and the blower apparatus, and it is possible to preferably prevent the contaminant from being mixed from the external portion. Further, since only the production system is isolated from the external portion by the partition wall construction, it is not necessary to set a whole of factory to a so-called clean room.

First, a description will be given of a polishing cleaning apparatus. The optical display unit W is taken out from the storage box, and is mounted to the feeding mechanism. If the optical display unit W reaches a cleaning position, the feed is stopped, and an end portion of the optical display unit W is held by a holding portion. A grinding portion is brought into contact with a top face of the optical display unit W from the vertical above, and the grinding portion is brought into contact with a lower face of the optical display unit from the vertical below. The grinding portions are rotated on both the surfaces of the optical display unit W. Accordingly, the attached contaminants on both the surfaces of the optical display unit W are removed. As the attached contaminant, for example, a micro piece of a glass, a fiber piece and the like are exemplified.

Next, a description will be given of a water cleaning apparatus. The grind cleaned optical display unit W is fed to a water bath by the feeding mechanism, and is water cleaned here. A pure water flows in an inner portion of the water bath. Both faces of the optical display unit W fed from the water bath are cleaned by the pure water flown out of a flowing water pipe. Next, the optical display unit W is drained by a ventilation of the clean air by means of a drying apparatus. Next, the optical display unit W is fed to the first bonding apparatus. In this case, as the other embodiment, it is possible to clean by using an ethanol water solution in place of the pure water. Further, as the other embodiment, it is possible to omit the water bath.

Next, a description will be given below of the various apparatuses. The first material roll of the long first sheet material F1 is installed to a roll mount apparatus working with a motor or the like in such a manner as to rotate free or rotate at a fixed rotating speed. The rotating speed is set by a controller and is drive-controlled.

The first feeder is a feeding mechanism feeding the first sheet material F1 to a downward side. The first feeder is provided with a lot of feed rollers, and the first sheet material F1 is fed along a feed path formed by the feed rollers. The feed path extends from the first material roll to the first bonding apparatus. The first feeder is controlled by the controller.

The first pre-inspection peeling apparatus is structured such as to peel off the first release film F12 from the first sheet material F1 fed along the feed path, and wind around the roll. The winding speed around the roll is controlled by the controller. The peeling mechanism is structured such as to have a knife edge portion having a sharp leading end, peel off the first release film F12 by winding the first release film F12 around the knife edge portion so as to reverse transfer, and feed the first sheet material F1 after peeling off the first release film F12 in the feeding direction.

The first inspecting apparatus inspects the defect after peeling off the first release film F12. The first inspecting apparatus analyzes an image data photographed by a CCD camera so as to detect the defect, and calculates a position coordinate thereof. The position coordinate of this defect is provided for the skip cut by the first cutting apparatus mentioned below.

The first release film laminating apparatus laminates the first release film F12 to the first optical film F11 via the first pressure-sensitive adhesive layer F14 after the first defect inspection. The first release film F12 is unwound from the material roll of the first release film F12, and the first release film F12 and the first optical film F11 are pinched by one or a plurality of roller pairs, and are laminated by applying a predetermined pressure by means of the roller pairs. A rotating speed, a pressure and a feeding of the roller pairs are controlled by the controller.

In the case that the skip cut is carried out based on only the defect information input so as to coordinate to the delivered first material roll, as mentioned above, it is possible to omit the defect inspection by the first inspecting apparatus. As mentioned above, in the case that the defect inspection by the first inspecting apparatus is omitted, the structure may be made such as not to be provided with the first pre-inspection peeling apparatus, the first inspecting apparatus and the first release film laminating apparatus.

The first cutting apparatus cuts the first optical film F11, the surface protecting film F13, the first pressure-sensitive adhesive layer F14 and the pressure-sensitive adhesive layer F15 into a predetermined size without cutting the first release film F12. The first cutting apparatus is constituted, for example, by a laser. The first cutting apparatus cuts into the predetermined size in such a manner as to avoid the defect portion, based on the position coordinate of the defect detected by the first inspecting step, or the position coordinate of the defect included in the defect information input so as to coordinate to the first material roll. In other words, the cut article including the defect portion is excluded as the defective by the first rejection apparatus in the later step. Alternatively, the first cutting apparatus may continuously cut into the predetermined size without respect to the existence of the defect. In this case, the structure may be made such as to remove the portion without bonding, in a bonding step mentioned below. The control in this case is based on the function of the controller.

Further, the first cutting apparatus arranges a holding table adsorbing and holding the first sheet material F1 from a rear face, and is provided with the laser above the first sheet material F1. It horizontally moves in such a manner as to scan the laser in a width direction of the first sheet material F1, and cuts the first optical film F11, the first pressure-sensitive adhesive layer F14, the surface protecting film F13 and the pressure-sensitive adhesive layer F15 at a predetermined pitch in a feeding direction thereof while leaving the first release film F12 in the lowest portion (hereinafter, refer optionally to as "half cut"). Further, it is preferable that the laser is integrally configured by an air nozzle spraying a warm air toward the cut position, and a smoke collecting duct collecting a gas (a smoke) generated from the cut position fed by the warm air, in a state in which they oppose to each other, in such a manner as to pinch from the width direction of the first sheet material F1. In the case of adsorbing the first sheet material F1 by the holding table, an accumulator of the feeding mechanism is structured such as to move up and down in a vertical direction, so as not to stop the continuous feed of the first sheet material F1 in a downstream side and an upstream side. This motion is based on the control of the controller.

The first bonding apparatus bonds the first sheet material F1 (the first optical film F11) from which the first release film F12 is peeled off by the first peeling apparatus to the optical display unit W via the first pressure-sensitive adhesive layer F14, after the cutting step mentioned above. The feed path of the first sheet material F1 is above the feed path of the optical display unit W. The flow of the clean air from the blower apparatus is blocked by the first sheet material F1, and a wind force becomes weak in the top face of the optical display unit W.

In the case of bonding, the first optical film F11 is bonded to the optical display unit W surface while pressure welding by a pressing roller and a guide roller. A pressing pressure and a driving motion of the pressing roller and the guide roller are controlled by the controller.

The peeling mechanism of the first peeling apparatus is structured such as to have a knife edge portion having a sharp leading end, peel off the first release film F12 by winding the first release film F12 around the knife edge portion so as to reverse transfer, and feed the first sheet material F1 (the first optical film F11) after peeling off the first release film F12 to the optical display unit W surface. At this time, it is possible to improve a bonding precision of the first optical film by carrying out a state in which a tensile force which is equal to or more than 150 N/m and equal to or less than 1000 N/m is applied to the first release film F12 and/or a time until the first optical film is pressure contacted with the optical display unit W surface after the first release film F12 is peeled off, within three seconds. If the tensile force is smaller than 150 N/m, a feeding position of the first optical film is not stable, and if it is larger than 1000 N/m, there is a risk that the first release film F12 extends so as to be broken. If the time till the pressure contact is longer than three seconds, there is a risk that the first optical film peeled off from the first release film F12 is curved and a bending or an air bubble is generated. The peeled first release film F12 is wound around the roll. A winding control of the roll is controlled by the controller.

The bonding mechanism is configured by the pressing roller and the guide roller arranged so as to oppose thereto. The guide roller is configured by a rubber roller which is rotationally driven by a motor, and is arranged so as to be movable up and down. Further, the pressing roller configured by a metal roller which is rotationally driven by a motor is arranged just above the same so as to be movable up and down. The pressing roller is structured such as to be moved up to a higher position than a top face thereof so as to form a roller interval at a time of feeding the optical display unit W to the bonding position. In this case, each of the guide roller and the pressing roller may be configured by the rubber roller or the metal roller. The optical display unit W is cleaned by the various cleaning apparatuses as mentioned above, and is structured such as to be fed by the feeding mechanism. The feed control of the feeding mechanism is also controlled by the controller.

A description will be given of the first rejection apparatus excluding the first sheet material F1 including the defect. If the first sheet material F1 including the defect is fed to the bonding position, the guide roller moves downward vertically. Next, the roller around which the adhesive tape is wound moves to a fixed position of the guide roller. The first sheet material F1 including the defect is pressed to the adhesive tape by moving the pressing roller downward vertically, the first sheet material F1 is bonded to the adhesive tape, and the first sheet material F1 including the defect is wound around the roller together with the adhesive tape.

As mentioned above, the first bonding apparatus and the first rejection apparatus constructs an optical film bonding portion bonding the first optical film F11 to the optical display unit W in a state in which a corresponding region to the defect is excluded, based on the defect information detected by the first inspecting apparatus or the defect information input so as to coordinate to the first material roll.

The optical display unit W to which the first optical film F11 is bonded as mentioned above is fed to a downward side, and the second optical film F21 (the second sheet material F2) is bonded thereto. In the following description, a similar apparatus structure will be briefly described.

In the case that the second optical film F21 is bonded to the first optical film F11 in a relation of 90 degree (a relation of crossed nicols), the second optical film F21 is bonded after rotating the optical display unit W at 90 degree by a feed direction switching mechanism of the feeding mechanism. In the bonding method of the second sheet material F2 described below, the structure is made such as to process each of the steps in a state in which the second sheet material F2 is reversed (in such a manner that the second release film F22 comes to a top face), and bond the second optical film F21 from a lower side of the optical display unit W.

The second material roll of the long second sheet material F2 is installed to the roll mount apparatus working with the motor or the like in such a manner as to rotate free or rotate at a fixed rotating speed. The rotating speed is set by the controller, and is drive-controlled.

The second feeder is a feeding mechanism feeding the second sheet material F2 to a downward side. The second feeder is provided with a lot of feed rollers, and the second sheet material F2 is fed along a feed path formed by these feed rollers. The feed path extends from the second material roll to the second bonding apparatus. The second feeder is controlled by the controller.

The second pre-inspection peeling apparatus is structured such as to peel off the second release film F22 from the second sheet material F2 fed along the feed path so as to wind around the roll. A winding speed around the roll is controlled by the controller. The peeling mechanism is structured such as to have a knife edge portion having a sharp leading end, peel off the second release film F22 by winding the second release film F22 around the knife edge portion so as to reverse transfer, and feed the second sheet material F2 after peeling off the second release film F22 in the feeding direction.

The second inspecting apparatus inspects the defect after peeling off the second release film F22. The second inspecting apparatus analyzes the image data photographed by the CCD camera so as to detect the defect, and calculates a position coordinate thereof. The position coordinate of this defect is provided for the skip cut by the second cutting apparatus mentioned below.

The second release film laminating apparatus laminates the second release film F22 to the second optical film F21 via the second pressure-sensitive adhesive layer F24 after the second defect inspection. The second release film F22 is unwound from the material roll of the second release film F22, and the second release film F22 and the second optical film F21 are pinched by one or a plurality of roller pairs, and are laminated by applying a predetermined pressure by means of the roller pairs. A rotating speed, a pressure and a feeding of the roller pairs are controlled by the controller.

In the case that the skip cut is carried out based on only the defect information input so as to coordinate to the delivered second material roll, as mentioned above, it is possible to omit the defect inspection by the second inspecting apparatus. As mentioned above, in the case that the defect inspection by the second inspecting apparatus is omitted, the structure may be made such as not to be provided with the second pre-inspection peeling apparatus, the second inspecting apparatus and the second release film laminating apparatus.

The second cutting apparatus cuts the second optical film F21, the surface protecting film F23, the second pressure-sensitive adhesive layer F24 and the pressure-sensitive adhesive layer F25 into a predetermined size without cutting the second release film F22. The second cutting apparatus is constituted, for example, by a laser. The second cutting apparatus cuts into the predetermined size in such a manner as to avoid the defect portion, based on the position coordinate of the defect detected by the second inspecting step, or the position coordinate of the defect included in the defect information input so as to coordinate to the second material roll. In other words, the cut article including the defect portion is excluded as the defective by the second rejection apparatus in the later step. Alternatively, the second cutting apparatus may continuously cut into the predetermined size without respect to the existence of the defect. In this case, the structure may be made such as to remove the portion without bonding, in a bonding step mentioned below. The control in this case is based on the function of the controller.

Further, the second cutting apparatus arranges a holding table adsorbing and holding the second sheet material F2 from a rear face, and is provided with the laser below the second sheet material F2. It horizontally moves in such a manner as to scan the laser in a width direction of the second sheet material F2, and cuts the second optical film F21, the second pressure-sensitive adhesive layer F24, the surface protecting film F23 and the pressure-sensitive adhesive layer F25 at a predetermined pitch in a feeding direction thereof while leaving the second release film F22 in the lowest portion. In the case of adsorbing the second sheet material F2 by the holding table, an accumulator of the feeding mechanism is structured such as to move up and down in a vertical direction, so as not to stop the continuous feed of the second sheet material F2 in a downstream side and an upstream side. This motion is based on the control of the controller.

The second bonding apparatus bonds the second sheet material F2 (the second optical film F21) from which the second release film F22 is peeled off by the second peeling apparatus to the optical display unit W via the second pressure-sensitive adhesive layer F24, after the cutting step. In the case of bonding, the second optical film F21 is bonded to the optical display unit W surface while pressure welding by a pressing roller and a guide roller. A pressing pressure and a driving motion of the pressing roller and the guide roller are controlled by the controller.

The peeling mechanism of the second peeling apparatus is structured such as to have a knife edge portion having a sharp leading end, peel off the second release film F22 by winding the second release film F22 around the knife edge portion so as to reverse transfer, and feed the second sheet material F2 (the second optical film) after peeling off the second release film F22 to the optical display unit W surface. At this time, it is possible to improve a bonding precision of the second optical film by carrying out a state in which a tensile force which is equal to or more than 150 N/m and equal to or less than 1000 N/m is applied to the second release film F22 and/or a time until the second optical film is pressure contacted with the optical display unit W surface after the second release film F22 is peeled off, within three seconds. If the tensile force is smaller than 150 N/m, a feeding position of the second optical film is not stable, and if it is larger than 1000 N/m, there is a risk that the second release film F22 extends so as to be broken. If the time till the pressure contact is longer than three seconds, there is a risk that the first optical film peeled off from the second release film F22 is curved and a bending or an air bubble is generated. The peeled second release film F22 is wound around the roll. A winding control of the roll is controlled by the controller.

The bonding mechanism is configured by the pressing roller and the guide roller arranged so as to oppose thereto. The guide roller is configured by a rubber roller which is rotationally driven by a motor, and is arranged so as to be movable up and down. Further, the pressing roller configured by a metal roller which is rotationally driven by a motor is arranged just below the same so as to be movable up and down. The pressing roller is structured such as to be moved down to a below position so as to form a roller interval at a time of feeding the optical display unit W to the bonding position. In this case, each of the guide roller and the pressing roller may be configured by the rubber roller or the metal roller.

A description will be given of the second rejection apparatus excluding the second sheet material F2 including the defect. If the second sheet material F2 including the defect is fed to the bonding position, the guide roller moves upward vertically. Next, the roller around which the adhesive tape is wound moves to a fixed position of the guide roller. The second sheet material F2 including the defect is pressed to the adhesive tape by moving the pressing roller upward vertically, the second sheet material F2 is bonded to the adhesive tape, and the second sheet material F2 including the defect is wound around the roller together with the adhesive tape.

As mentioned above, the second bonding apparatus and the second rejection apparatus constructs an optical film bonding portion bonding the second optical film F21 to the optical display unit W in a state in which a corresponding region to the defect is excluded, based on the defect information detected by the second inspecting apparatus or the defect information input so as to coordinate to the second material roll.

The optical display device formed by bonding the first and second sheet materials to the optical display unit W is fed to the inspecting apparatus. The inspecting apparatus executes the inspection with respect to both faces of the fed optical display device. The light source emits light vertically to the top face of the optical display device by a half mirror, and a reflected light image is photographed as an image data by a CCD camera. Further, the other light source emits light to the front face of the optical display device at a predetermined angle, and a reflected light image is photographed as an image data by the CCD camera. The inspection of the opposite surface of the optical display device is executed in the same manner by using the light source and the CCD camera. The defect is image processed and analyzed from the image data, and a non-defective is determined.

An operation timing of each of the apparatuses is calculated, for example, by a method that a sensor is arranged at a predetermined position so as to detect, or is calculated in such a manner as to detect a rotating member of the feeder and the feeding mechanism by a rotary encoder or the like. The controller may be achieved by a cooperating action between a software program and a hardware resource such as a CPU, a memory or the like. In this case, the program software, a processing procedure, various settings and the like are previously stored in the memory. Further, it can be configured by a dedicated circuit, a firmware or the like.

In the production system mentioned above, the structure is made such as to bond the first sheet material F1 (the first optical film F11) from the top face of the optical display unit W, and bond the second sheet material F2 (the second optical film F21) from the lower face of the optical display unit W. The wind force just below the blower apparatus becomes large, and the wind force becomes weaker toward a bottom of the partition wall structure. This is because the various apparatus members, the first sheet material F1, the optical display unit W and the pressure-sensitive adhesive tape stands in the way of the flow of the clean air. Particularly, the flow of the clean air is weak in the back side of the first sheet material F1, and there is a case that a retention of the clean air is generated in the top face side of the optical display unit W. There is thought that the weaker the flow of the clean air is, the lower the cleanliness factor isr. Since the dust and the contaminant are accumulated if the cleanliness factor is low, the contaminant is attached to the top face of the optical display unit W, and there is thought that this is not preferable.

(Production System in Accordance with Other Embodiment)

Accordingly, a description will be given below of a production system which can suppress the retention of the clean air, and can bond the first optical film F11 to the optical display unit W in a state in which the cleanliness factor is maintained high.

The first sheet material F1 is fed in a state in which the first release film F12 is set to the top face. The structures and the functions of the first pre-inspection peeling apparatus, the first inspecting apparatus, and first release film laminating apparatus are the same as mentioned above, however, the arrangements thereof are different in correspondence to the position of the first release film F12.

The first peeling apparatus, the first bonding apparatus, and the first rejection apparatus are also the same as mentioned above, in their structure and function, in the same manner, however, the arrangements thereof are different in correspondence to the position of the first release film F12. Accordingly, since the first sheet material F1 is fed in the lower portion than the optical display unit W, it is possible to maintain the cleanliness factor in the top face side of the optical display unit W high. Further, the cleanliness factor is low around the first sheet material F1, however, since the peeled first release film F12 is formed in the top face side, the problem that the contaminant is attached at a time of bonding is reduced, even if the suspended matter is attached to the first release film F12.

The second sheet material F2 is fed in a state in which the second release film F22 is set to the lower face. The second pre-inspection peeling apparatus, the second inspecting apparatus, the second release film laminating apparatus, and the second cutting apparatus are the same as mentioned above in the structures and the functions thereof, however, the arrangements thereof are different in accordance with the position of the second release film F22.

The second peeling apparatus, the second bonding apparatus, and the second rejection apparatus are also the same as mentioned above in the structures and the functions thereof, in the same manner, however, the arrangements thereof are different in accordance with the position of the second release film F22. In this arrangement, it is possible to maintain the cleanliness factor in the top face side of the optical display unit W high. Further, it is possible to maintain the cleanliness factor around the second sheet material F2 high.

A known defect inspecting method can be applied to the defect inspection. An automatic inspecting apparatus is a apparatus which automatically inspects a defect (which may be also called as a blemish) of the sheet material, and is structured such as to emit a light, acquire a reflected light image or a transmitted light image via an imaging portion such as a line sensor, a two-dimensional TV camera or the like, and carry out a defect detection based on the acquired image data. Further, the image data is acquired in a state in which a polarizing filter for inspection is interposed in a light path between a light source and an imaging portion. Generally, a polarization axis (for example, a polarization absorption axis) of the polarizing filter for inspection is arranged in such a manner as to come to a state (crossed nicols relation) being orthogonal to a polarization axis (for example, a polarization absorption axis) of the polarizing plate to be inspected. Based on the arrangement in the crossed nicols, a whole area black image is input from the imaging portion if the defect does not exist, however, if the defect exists, the corresponding portion does not come to black (is recognized as a bright spot). Accordingly, it is possible to detect the defect by setting an appropriate threshold value. In the bright spot detection as mentioned above, the defect such as the surface attached material, the internal contaminant is detected as the bright spot. Further, in addition to the bright spot detection, there is a method of detecting the contaminant by CCD imaging the transmitted image with respect to the subject so as to analyze the image. Further, there is a method of detecting the surface attached contaminant by CCD imaging the reflected light image with respect to the subject so as to analyze the image.

The description is given of the method (the half cut method) of cutting the other members of the sheet material without cutting the release film, in the cutting step mentioned above. In accordance with the structure mentioned above, it is possible to cut the optical film and the pressure-sensitive adhesive layer without cutting the release film laminated to the optical film via the pressure-sensitive adhesive layer, and peel off the release film from the optical film before the bonding step applied to the optical display unit. In other words, since the structure can be made such that the pressure-sensitive adhesive layer corresponding to the bonding surface of the optical film is not exposed until just before the bonding, it is possible to prevent the contaminant from being mixed into the bonding surface of the optical film.

Particularly, it is possible to feed the cut optical film and pressure-sensitive adhesive layer while using the release film as the carrier, by cutting the optical film and the pressure-sensitive adhesive layer without cutting the release film. Accordingly, since the feeder of the optical film can be made as a simpler structure, it is possible to further reduce the production cost of the optical display device.

(Order Entry and Shipping Order System)

Figure 4:
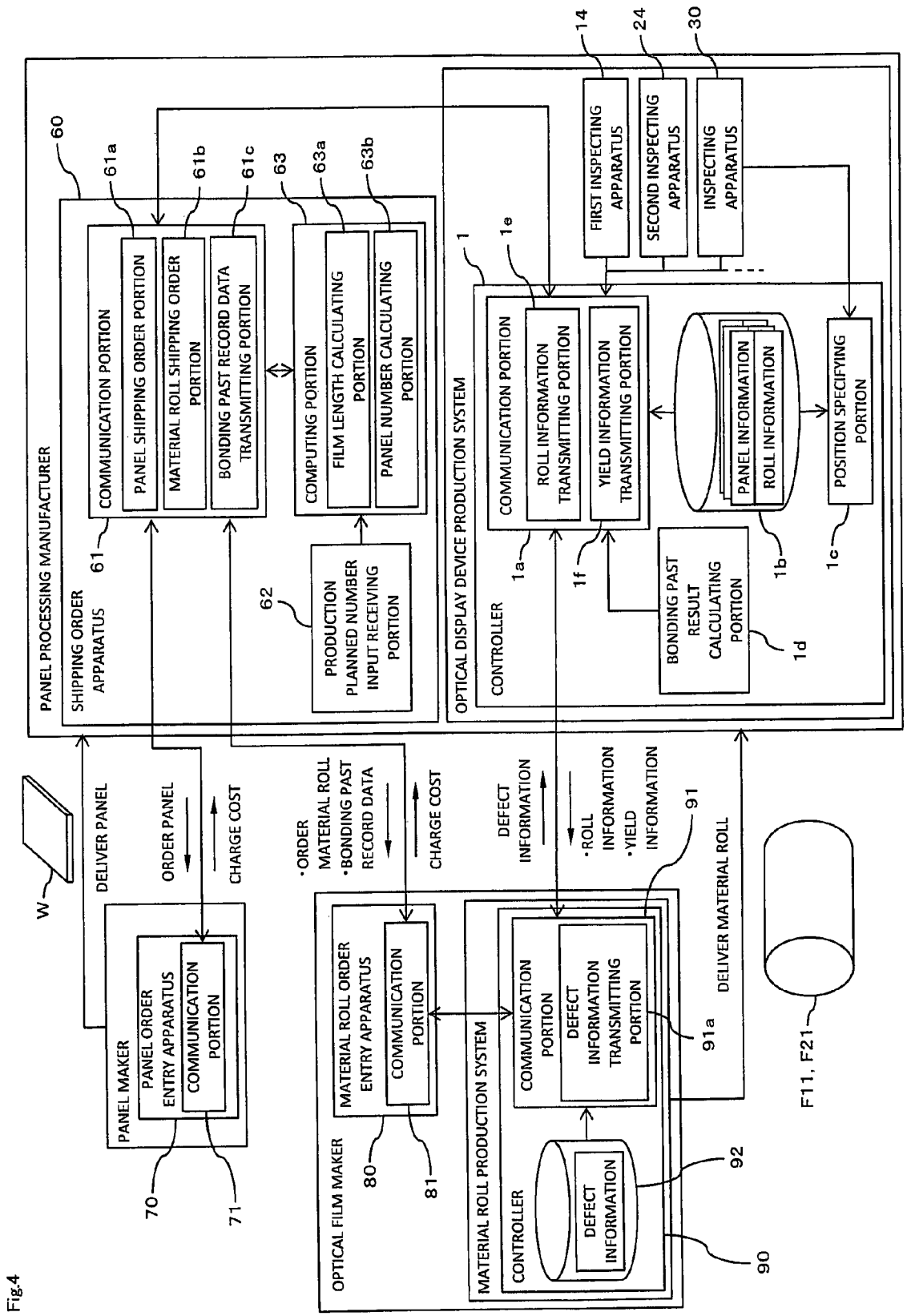
FIG. 4 is a block diagram showing an order entry and shipping order system of a material roll and an optical display unit which are used in an optical display device production system.

FIG. 4 is a block diagram showing an order entry and shipping order system of the material roll and the optical display unit W which are used in the optical display device production system. As shown in FIG. 4, the panel processing manufacturer is provided with a shipping order apparatus 60 for placing an order for the material roll and the optical display unit W which are used in the optical display device production system. The shipping order apparatus 60 serves as a material roll shipping order portion for placing an order for the material rolls of the optical films F11 and F21, and a panel shipping order portion for placing an order for the optical display unit W. The shipping order apparatus 60 is configured by a apparatus provided with the CPU, such as a personal computer, and is provided with a communication portion 61 and a production planned number input receiving portion 62. Further, the shipping order apparatus 60 serves as a computing portion 63 or the like based on an execution of a computer program by the CPU. In this case, the material roll shipping order portion and the panel shipping order portion are not limited to be configured by one apparatus, but may be configured by a plurality of apparatuses. Further, the material roll shipping order portion and the panel shipping order portion may be configured by different apparatus.

An optical display device production system set in the panel processing manufacturer is provided with the various apparatuses such as the first inspecting apparatus 14, the second inspecting apparatus 24 and the inspecting apparatus 30 each of which is controlled by the controller 1, in addition to the controller 1, as mentioned above. The controller 1 serves as an optical display device production management apparatus for managing the production of the optical display device in the optical display device production system, and a production management system of the optical display device is achieved by the processing of the controller 1. The controller 1 is configured by the apparatus provided with the CPU, such as the personal computer, and is provided with a communication portion 1a and a memory 1b. Further, the controller 1 is structured such as to also serve as a position specifying portion 1c and a bonding past record calculating portion 1d based on the execution of the computer program by the CPU.

The panel maker is provided with a panel order entry apparatus (a panel order entry portion) 70 receiving the shipping order of the optical display unit W from the shipping order apparatus 60. Further, the optical film maker is provided with a material roll order entry apparatus (a material roll order entry portion) 80 receiving the shipping order of the material roll from the shipping order apparatus 60. The panel order entry apparatus 70 and the material roll order entry apparatus 80 are configured by the apparatus provided with the CPU, such as the personal computer, and are provided with communication portions 71 and 81, respectively. In this case, the material roll order entry portion and the panel order entry portion are not limited to those configured by one apparatus, but may be configured by a plurality of apparatuses.

The optical film maker is provided with a material roll production system for generating the sheet materials F1 and F2 (the optical films F11 and F21) and producing the material roll around which the sheet materials F1 and F2 are wound, in addition to the material roll order entry apparatus 80. The material roll production system is provided with various apparatuses operating for producing the material roll, and a controller 90 controlling motions of the various apparatuses. The controller 90 serves as a material roll production management apparatus for managing the production of the material roll in the material roll production system, and the production management system of the material roll is achieved by a processing of the controller 90. The controller 90 is configured by the apparatus provided with the CPU, such as the personal computer, and is provided with a communication portion 91 and a memory 92.

The communication portion 1a of the controller 1, the communication portion 61 of the shipping order apparatus 60, the communication portion 71 of the panel order entry apparatus 70, the communication portion 81 of the material roll order entry apparatus 80, and the communication portion 91 of the controller 90 are connected so as to be communicable with each other via a communication line such as a local area network (LAN).

(Structure of Shipping Order Apparatus)

The shipping order apparatus 60 is provided with the communication portion 61, the production planned number input receiving portion 62 and the computing portion 63 as mentioned above. In this case, the production planned number input receiving portion 62 constructs a production planned number input receiving portion receiving an input of the production planned number of the optical display device. The production planned number is a number of the optical display devices which intend to be finally produced, and corresponds to the number of the optical display devices which are determined as the non-defectives by the inspecting apparatus 30.

The production planned number input receiving portion 62 may be structured such as to receive the production planned number input by manually operating an operation portion (not shown) provided in the shipping order apparatus 60, or may be structured such as to receive the production planned number input from an external portion via the communication portion 61.

The computing portion 63 serves in more detail as a film length calculating portion 63a and a panel number calculating portion 63b. The film length calculating portion 63a is a portion calculating the lengths of the optical films F11 and F21 before being cut in correspondence to the production planned number input to the production planned number input receiving portion 62, based on at least a result of inspection of the optical display device in which the optical films F11 and F21 are bonded to each other, by the inspecting apparatus 30. More specifically, the operation is carried out in such a manner as to add the lengths of the necessary optical films F11 and F21 at the lengths of the optical films F11 and F21 having the defect detected by the inspecting apparatus 30 and disposed in accordance with the reworking process. The result of inspection of the inspecting apparatus 30 is transmitted to the communication portion 61 of the shipping order apparatus 60 via the communication portion 1a of the controller 1, and is input to the computing portion 63.

In this case, the structure may be made such that the lengths of the optical films F11 and F21 before being cut in correspondence to the input production planned number is calculated by taking into consideration the result of inspection of the first inspecting apparatus 14 or the second inspecting apparatus 24, in addition to the result of inspection of the inspecting apparatus 30. In this case, the structure may be made such that the result of inspection of the first inspecting apparatus 14 or the second inspecting apparatus 24 is transmitted to the communication portion 61 of the shipping order apparatus 60 via the communication portion 1a of the controller 1, and is input to the computing portion 63.

Further, the structure may be made such as to calculate the lengths of the optical films F11 and F21 before being cut in correspondence to the input production planned number, based on the lengths of the optical films F11 and F21 excluded at a time of bonding to the optical display unit W in accordance with the skip cut method mentioned above. In other words, the structure may be made such that the operation is carried out in such a manner as to add the lengths of the necessary optical films F11 and F21 at the lengths of the optical films F11 and F21 excluded at a time of bonding to the optical display unit W. In this case, the structure may be made such that the data of the lengths of the optical films F11 and F21 excluded by the rejection apparatuses 19 and 29 is transmitted to the communication portion 61 of the shipping order apparatus 60 via the communication portion 1a of the controller 1, and is input to the computing portion 63.

The panel number calculating portion 63b is a portion calculating the number of the optical display unit W corresponding to the production planned number input to the production planned number input receiving portion 62, based on the result of inspection of the optical display device in which the optical films F11 and F21 are bonded to each other, by the inspecting apparatus 30. More specifically, the operation is carried out in such a manner as to add the number of the necessary optical display unit W at the number of the optical display device having the defect detected by the inspecting apparatus 30 and disposed without being determined as the non-defective in accordance with the reworking process.

The communication portion 61 serves as a panel shipping order portion 61a, a material roll shipping order portion 61b and a bonding past record data transmitting portion 61*c*. The panel shipping order portion 61*a* is a portion placing an order with the panel maker for the optical display units W by transmitting the number of data calculated by the panel number calculating portion 63*b* to the communicating portion 71 of the panel order entry apparatus 70. The panel maker delivers the corresponding number of optical display units W to the data receiving from the panel shipping order portion 61*a* to the panel maker, and charges a cost by transmitting a cost data corresponding to the number of the delivered optical display units W to the communicating portion 61 of the shipping order apparatus 60 from the communication portion 71.

The material roll shipping order portion 61*b* is a portion placing an order with the optical film maker for the material roll formed by winding the optical films F11 and F21 having a length calculated by the film length calculating portion 63*a*, by transmitting the data of the length calculated by the film length calculating portion 63*a* to the communication portion 81 of the material roll order entry apparatus 80. The optical film maker delivers the material roll formed by winding the optical films F11 and F21 (the sheet materials F1 and F2) having the length corresponding to the data receiving from the material roll shipping order portion 61*b* to the panel processing manufacturer, and charges a cost by transmitting a cost data corresponding to the length of the delivered material roll to the communication portion 61 of the shipping order apparatus 60 from the communication portion 81. In this case, the material roll delivered to the panel processing manufacturer from the optical film maker may be constituted by a slit material which is slit to a predetermined width, or may be constituted by a material roll which is not slit, as mentioned below.

The bonding past record data transmitting portion 61*c* is a portion transmitting a bonding past record data calculated by the bonding past record calculating portion 1*d* provided in the controller 1 of the optical display device production system mentioned below, to the communication portion 81 of the material roll order entry apparatus 80. The bonding past record data is structured such as to be received by the communication portion 61 of the shipping order apparatus 60 via the communication portion 1*a* of the controller 1.

(Structure of Controller of Optical Display Device Production System)

The controller 1 of the optical display device production system is provided with the communication portion 1*a*, the memory 1*b*, the position specifying portion 1*c* and the bonding past record calculating portion 1*d*, as mentioned above. The memory 1*b* is an information storage portion storing the panel information and the roll information so as to coordinate. The panel information and the roll information are stored, for example, so as to be coordinated one for one. In this case, the panel information is an identification information allocated per the optical display unit W, and the optical display unit W can be specified based on the panel information. The roll information is an information relating to the optical films F11 and F21 which are bonded to the optical display unit W, and includes the position information of the optical films F11 and F21 in the material roll before the optical films F11 and F21 are cut, for example, the position information in the length direction in the material roll. The roll information includes an identification information allocated per the material roll and the like in addition to the position information mentioned above.

The panel information and the roll information are input to the controller 1 so as to be stored in the memory 1*b* (an information storing step), for example, at a time of or after setting the optical display unit W and the material roll with respect to the optical display device production system. The panel information may be structured such as to be input by manually operating an operation portion (not shown) provided in the controller 1, or may be structured such that a panel information holding portion readably holding the panel information is attached to each of the optical display units W and the panel information is read from the panel information holding portion. Further, the roll information may be structured such as to be input by manually operating the operating portion provided in the controller 1, or may be structured such that a roll information holding portion readably holding the roll information is attached to each of the material rolls, and the roll information is read from the roll information holding portion.

As the panel information holding portion and the roll information holding portion, it is possible to employ various codes in which the held panel information or roll information is optically readable, for example, a two-dimensional code such as a QR code, in addition to a one-dimensional code such as a bar code. In this case, the panel information holding portion and the roll information holding portion is not limited to the structure in which the held panel information or roll information is optically readable, but may be structured such as to be readably by using a radio wave or the like, such as a radio frequency identification (RFID) tag.

The position specifying portion 1*c* is a portion specifying the position in the material roll before the optical films F11 and F21 of the optical display device are cut, based on the result of inspection of the optical display device in which the optical films F11 and F21 are bonded to each other by the inspecting apparatus 30, and the panel information and the roll information stored in the memory 1*b*. In other words, it specifies what position in the material roll the optical films F11 and F21 bonded to the optical display unit W exit before being cut, based on the panel information of the optical display unit W in the optical display device in which the defect is detected by the inspecting apparatus 30.

The bonding past record calculating portion 1*d* is a portion calculating the lengths of the optical films F11 and F21 bonded to the optical display unit W of the optical display device which is finally determined as the non-defective, based on the result of inspection of the inspecting apparatus 30. The data of the lengths of the optical films F11 and F21 calculated as mentioned above is transmitted as the bonding past record data, to the communication portion 61 of the shipping order apparatus 60 via the communication portion 1*a* of the controller 1. The bonding past record data transmitting portion 61*c* of the communication portion 61 transmits the received bonding past record data to the communication portion 81 of the material roll order entry apparatus 80.

The communication portion 1*a* serves as a roll information transmitting portion 1*e* and a yield information transmitting portion 1*f*. The roll information transmitting portion 1*e* is a portion transmitting the roll information stored in the memory 1*b* to the communication portion 91 of the controller 90 in the material roll production system, based on the result of inspection of the inspecting apparatus 30. In other words, the corresponding roll information is read out of the memory 1*b* based on the panel information of the optical display unit W in the optical display device in which the defect is detected by the inspecting apparatus 30, and is transmitted to the communication portion 91 of the controller 90.

The yield information transmitting portion 1*f* is a portion transmitting the yield information of the optical display device produced by the optical display device production system to the communication portion 91 of the controller 90 in the material roll production system. The yield information is an information relating to which of the non-defective and the defective each of the optical display devices produced by bonding the optical films F11 and F21 to the optical display unit W is determined by the defective inspection of the inspecting apparatus 30, for example, is calculated as an information indicating a rate of the non-defective or the defective in the produced optical display device, based on the result of inspection of the inspecting apparatus 30.

(Structure of Controller of Material Roll Production System)

The controller 91 of the material roll production system is provided with the communication portion 91 and the memory 92 as mentioned above. The defect information of the material roll produced in the material roll production system is stored in the memory 92, and the positional information in the material roll of the defect provided in the material roll is at least included in the defect information, as mentioned above.

The communication portion 91 serves as a defect information transmitting portion 91a. The defect information transmitting portion 91a is a portion transmitting the defect information of the produced material roll to the communication portion 1a of the controller 1 in the optical display device production system, and reads the defect information stored in the memory 92 so as to transmit (a defect information transmitting step). It is preferable that the defect information of the material roll is transmitted so as to coordinate to the material roll, and the structure is made, for example, such that the defect information corresponding to the material roll is transmitted together with the allocated identification information per the material roll, at a time when the material roll is delivered to the panel processing manufacturer from the optical film maker.

In this case, in the embodiment in FIG. 4, there is shown the case that the shipping order apparatus (the panel shipping order apparatus) of the optical display unit W, and the shipping apparatus of the material roll (the material roll shipping order apparatus) are configured by one shipping order apparatus 80, however, the structure is not limited to this construction, but the panel shipping order apparatus and the material roll shipping order apparatus are configured by the separate apparatuses. In this case, the structure may be made such that the material roll shipping order apparatus is provided in the panel maker in place of the panel processing manufacturer, the material roll is ordered to the optical film maker from the panel maker, and the cost is charged to the panel maker from the optical film maker. Further, the structure may be made such that the panel shipping order apparatus is provided in the optical film maker in place of the panel processing manufacturer, the optical display unit W is ordered to the panel maker from the optical film maker, and the cost is charged to the optical film maker from the panel maker.

Further, the various apparatuses provided in the optical display device production system as shown in FIG. 3 or 4 are not limited to the structure in which all of them are provided in the panel processing manufacturer, but may be structured such that at least a part of them is provided in the panel maker or the optical film maker.

(Processing by Shipping Order Apparatus)

Figure 5:
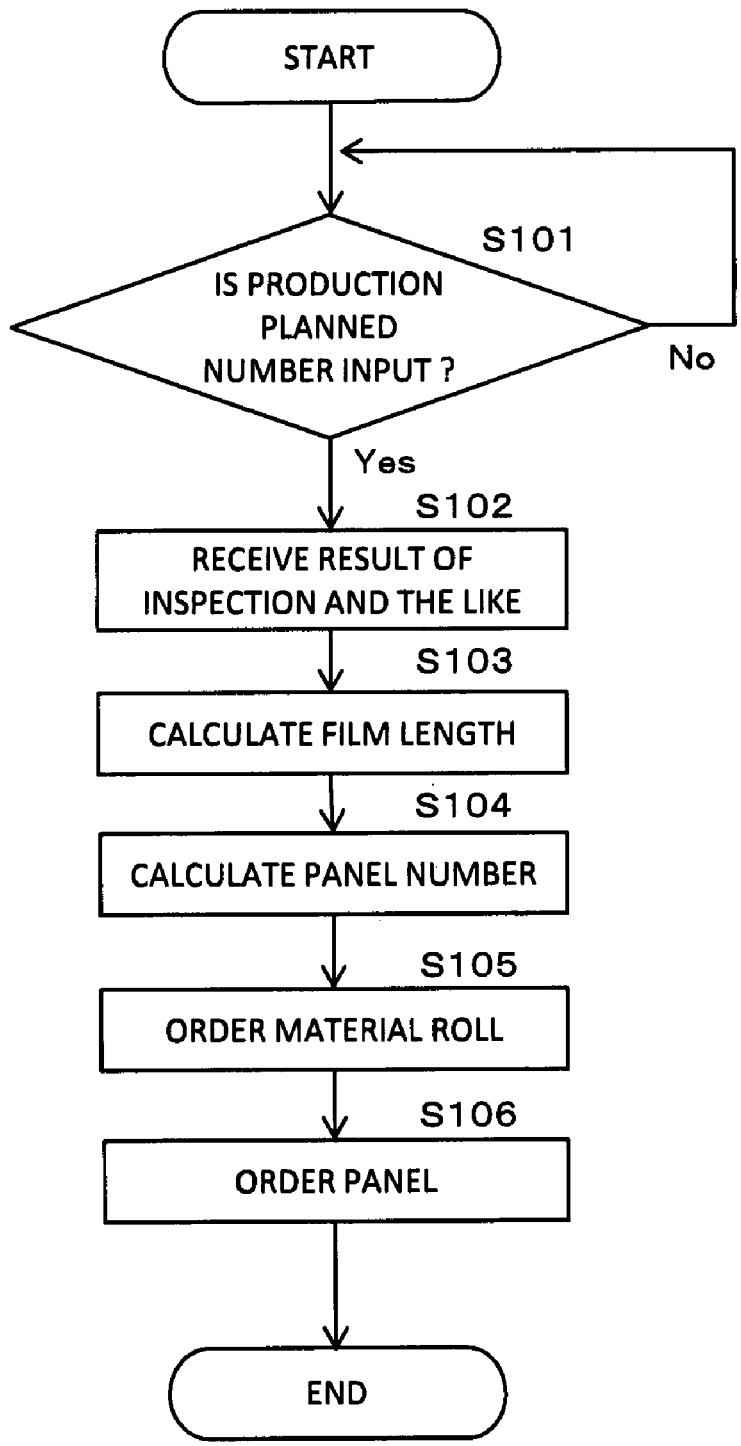
FIG. 5 is a flow chart showing an example of a process carried out by an order shipping apparatus at a time when a production plan number is input.

FIG. 5 is a flow chart showing an example of a processing carried out by the shipping order apparatus 60 at a time when the production planned number is input. If the production planned number is received by the production planned number input receiving portion 62 based on the input of the production planned number to the shipping order apparatus 60 (Yes in step S101: production planned number input receiving step), the data used for the computation by the computing portion 63 such as the result of inspection of the inspecting apparatus 30 is received by the communication portion 61 of the shipping order apparatus 60 from the communication portion 1a of the controller 1 (step S102).

Thereafter, the lengths of the optical films F11 and F21 before the cutting corresponding to the input production planned number are calculated by the film length calculating portion 63a based on the received data (step S103: film length calculating step), and the number of the optical display unit W corresponding to the input production planned number is calculated by the panel number calculating portion 63b (step S104: panel number calculating step) Further, the material roll formed by winding the optical films F11 and F21 having the calculated length is ordered from the material roll shipping order portion 61b of the communication portion 61 (step S105: material roll shipping order step), and the calculated number of optical display units W are ordered from the panel shipping order portion 61a of the communication portion 61 (step S106: panel shipping order step).

In accordance with the processing of the shipping order apparatus 60 as mentioned above, it is possible to calculate the lengths of the optical films F11 and F21 before the cutting corresponding to the input production planned number on the basis of the result of inspection of the optical display device to which the optical films F11 and F21 are bonded, with the inspecting apparatus 30, and it is possible to place an order for the material roll formed by winding the optical films F11 and F21 having the lengths. In other words, since it is possible to place an order for the material roll having the length calculated while taking into consideration the result of inspection by the inspecting apparatus 30, in place of placing an order for the material roll having the length which is necessary for obtaining the same number of optical films F11 and F21 as the input production planned number, it is possible to more securely place an order for the material roll having an actually necessary length, and it is possible to minimize an available of the material roll.

Further, as mentioned above, it is possible to employ such a structure as to calculate the lengths of the optical films F11 and F21 before the cutting corresponding to the input production planned number, based on the lengths of the optical films F11 and F21 which are excluded at a time of bonding to the optical display unit W in accordance with a skip cut method. In this case, it is possible to calculate the lengths of the optical films F11 and F21 before the cutting corresponding to the input production planned number based on the lengths of the optical films F11 and F21 which are excluded at a time of bonding to the optical display unit W, in addition to the result of inspection of the optical display device in which the optical films F11 and F21 are bonded, with the inspecting apparatus 30. Accordingly, since it is possible to place an order for the material roll having the length calculated while taking into consideration the lengths of the optical films F11 and F21 which are excluded at a time of bonding to the optical display unit W, in addition to the result of inspection by the inspecting apparatus 30, it is possible to more securely place an order for the material roll having the actually necessary length, and it is possible to minimize an available of the material roll.

Further, it is possible to place the corresponding number of optical display units W to the production planned number, in addition to the material roll having the corresponding length to the production planned number, based on the input production planned number, it is possible to more efficiently receive and place an order. Particularly, since it is possible to place an order for the number of optical display units W calculated while taking into consideration the result of inspection by the inspecting apparatus 30, in place of the shipping order of the same number of optical display units W as the input production planned number, it is possible to more securely place an order for the actually necessary number of optical display units W, and it is possible to minimize an available of the optical display unit W.

(Processing by Material Roll Order Entry Apparatus)

Figure 6:
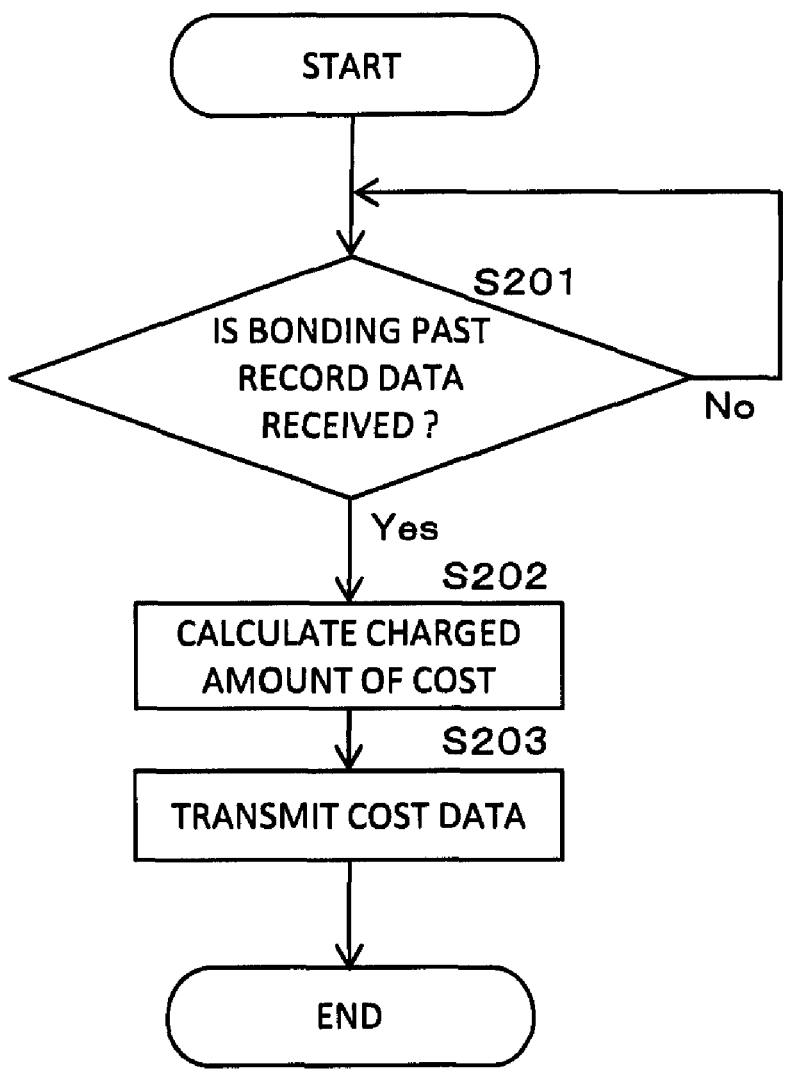
FIG. 6 is a flow chart showing an example of a process carried out by a material roll order entry apparatus at a time of receiving a bonding past record data.

FIG. 6 is a flow chart showing an example of a processing carried out by the material roll order entry apparatus 80 at a time of receiving the bonding past record data. The bonding past record data is transmitted from the bonding past record data transmitting portion 61c of the communication portion 61 in the shipping order apparatus 60 (a bonding past record data transmitting step), and if the bonding past record data is received by the communication portion 81 of the material roll order entry apparatus 80 (Yes in step S201), a charged amount of the cost of the ordered material roll is calculated based on the bonding past record data, in the material roll order entry apparatus 80 (step S202). Further, the cost data of the calculated amount is transmitted to the communication portion 61 of the shipping order apparatus 60 from the communication portion 81, whereby the cost is charged (step S203).

In this manner, since it is possible to charge the cost while taking into consideration the defect included in the material roll, based on the bonding past record data of the optical films F11 and F21 with respect to the optical display unit W based on the result of inspection of the inspecting apparatus 30, in addition to the length of the material roll ordered by the material roll shipping order portion 61 of the communication portion 61 in the shipping order apparatus 60, it is possible to provide a more preferable order entry and shipping order system.

(Processing by Controller of Optical Display Device Production System)

Figure 7:
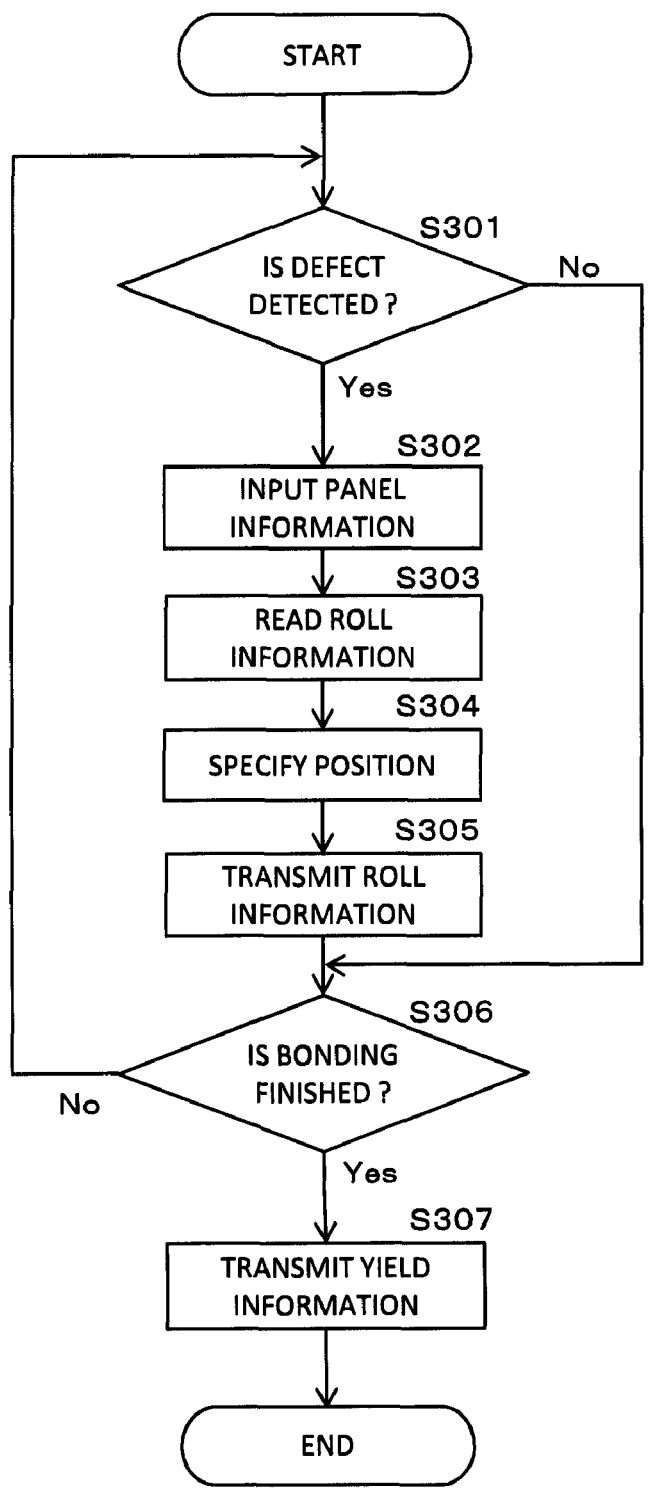
FIG. 7 is a flow chart showing an example of a process carried out by a controller during a bonding of the optical film to the optical display unit.
Figure 8:
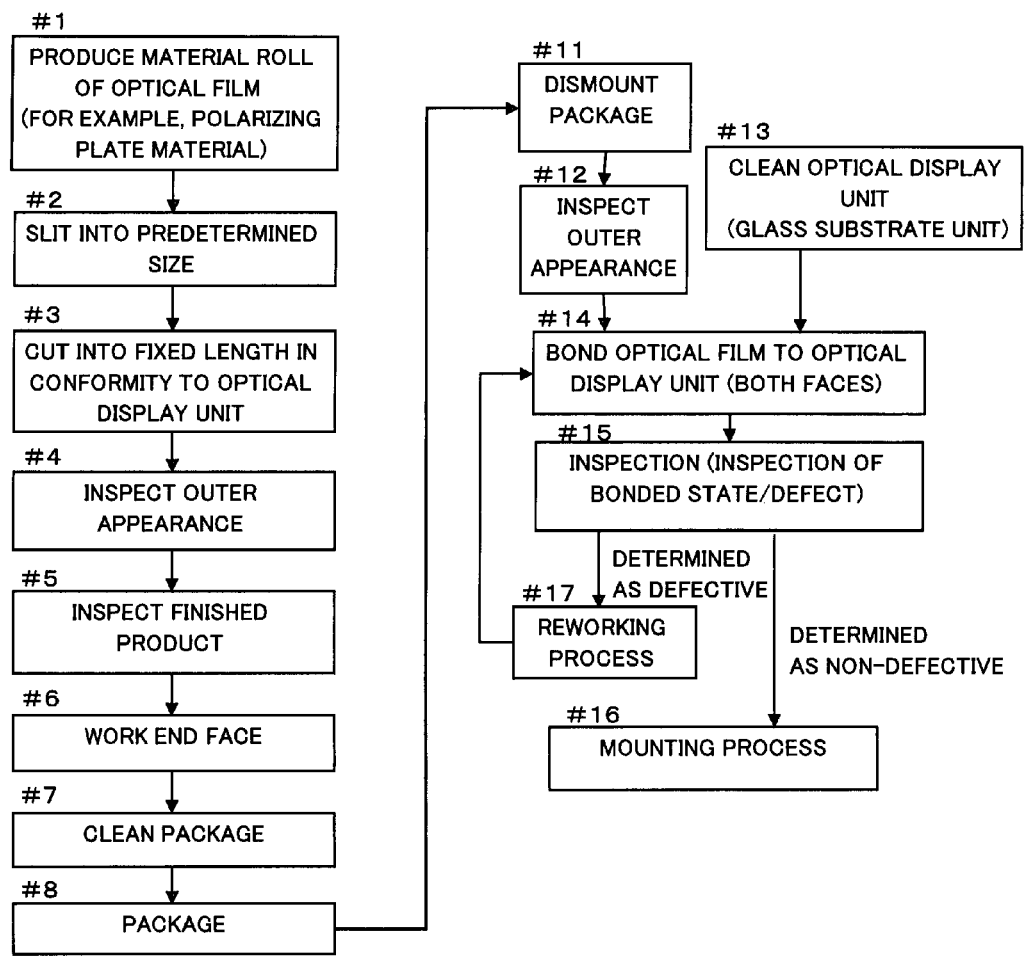
FIG. 8 is a flow chart of a production method of a conventional optical display device.

FIG. 7 is a flow chart showing an example of the process carried out by the controller 1 during the bonding of the optical films F11 and F21 with respect to the optical display unit W. In the case that the defect is detected by the inspecting apparatus 30 during the bonding of the optical films F11 and F21 with respect to the optical display unit W (Yes in step S301), a panel information corresponding to the optical display unit W of the optical display device in which the defect is detected is input (step S302). The input of the panel information may be structured such as to be carried out by manually operating the operation portion provided in the controller 1, or may be structured such that a panel information holding portion readably holding the panel information is attached to each of the optical display units W, and the input is carried out by reading the panel information from the panel information holding portion.

If the panel information is input, a roll information corresponding to the panel information is read out of the memory 1b (step S303). Further, the position in the material roll before the optical films F11 and F21 bonded to the optical display unit W are cut is specified based on the read roll information, by means of the position specifying portion 1c (step S304: position specifying step). Further, the roll information corresponding to the panel information of the optical display unit W of the optical display device in which the defect is detected is transmitted to the communication portion 91 of the controller 90 in the material roll production system, by the roll information transmitting portion 1e of the communication portion 1a (step S305: roll information transmitting step).

In this manner, during the bonding of the optical films F11 and F21 with respect to the optical display unit W, the roll information corresponding to the panel information of the optical display unit W is transmitted, as well as the positions of the optical films F11 and F21 bonded to the optical display unit W of the optical display device in which the defect is detected are specified, each time the defect is detected by the inspecting apparatus 30. Further, when the bonding of the optical films F11 and F21 unwound from the material roll to the optical display unit W is finished (Yes in step S306), the yield information of the produced optical display device is transmitted to the communication portion 91 of the controller 90 in the material roll production system by the yield information transmitting portion 1f of the communication portion 1a (step S307: yield information transmitting step). In this case, the roll information is not limited to such a structure as to be transmitted each time the defect is detected, but may be structured such that the roll information is stored in the memory 1b at a time when the defect is detected, and is transmitted at a time when the bonding of the optical films F11 and F21 is finished. In this case, the roll information may be collectively transmitted together with the other information such as the yield information and the like.

In accordance with the processing of the controller 1 mentioned above, it is possible to recognize what position in what material roll the defect exists, based on the result of inspection of the optical display device in which the optical films F11 and F21 are bonded, the panel information and the roll information. In other words, since the panel information and the roll information are stored so as to coordinate, it is possible to specify the position in the material roll before the optical films F11 and F21 bonded to the optical display unit W are cut, based on the panel information corresponding to the optical display unit W of the optical display device which is determined to have the defect based on the inspection of the inspecting apparatus 30, and the roll information coordinated to the panel information. If it is possible to recognize what position in what material roll the defect exists, as mentioned above, it is possible to carry out the production management more precisely. In this case, the information of the positions of the optical films F11 and F21 in the specified material roll can be used in the optical display device production system, or can be transmitted to the other system such as the material roll production system so as to be used.

Further, since the defect information of the delivered material roll is transmitted from the communication portion 91 of the controller 90 in the material roll production system to the communication portion 1a of the controller 1 in the optical display device production system, it is possible to collate the defect information, and the position of the defect specified by the position specifying portion 1c based on the result of inspection of the inspecting apparatus 30, the panel information and the roll information. Accordingly, it is possible to more precisely carry out the production management by collating the defect inspection at a time of producing the material roll, and the defect inspection of the optical display device in which the optical films F11 and F21 are bonded.

Further, since the roll information is transmitted to the communication portion 91 of the controller 90 in the material roll production system from the communication portion 1a of the controller 1 in the optical display device production system, based on the result of inspection of the inspecting apparatus 30, it is possible to recognize in the controller 90 what material roll the defect exists. Accordingly, since the controller 90 can efficiently exclude the defect from the produced material roll by managing the production of the material roll based on the received roll information, it is possible to improve the yield of the material roll.

Further, since the yield information of the optical display device is transmitted to the communication portion 91 of the controller 90 in the material roll production system from the communication portion 1a of the controller 1 in the optical display device production system, it is possible to recognize in the controller 90 an influence which the defect included in the material roll gives to the yield of the optical display device based on the yield information. Accordingly, the controller 90 can manage the defect inspection at a time of producing the material roll, based on the yield information of the optical display device received from the controller 1 of the optical display device production system, it is possible to more precisely carry out the production management.

(Example of Structure and Producing Method of Optical Film)

First, a description will be given of a polarizing plate as one example of the optical film. The polarizing plate can be obtained by laminating, for example, a tri-acetyl cellulose (TAC) film (a polarizer protecting film) to one face of a previously produced polyvinyl alcohol film (a polarizer), and laminating a polyethylene terephthalate (PET) to the other face.

The material roll of the polarizing plate, is produced, for example, in accordance with the following producing steps. (A) Step of Obtaining Polarizer, as a previous step. In this step, the polarizer is obtained by drying a polyvinyl alcohol (PVA) film to which dyeing, crosslinking and stretching steps are applied. (B) Step of Producing Polarizing Plate. In this step, the polarizing plate is produced by laminating the TAC film to one face of the polarizer via an adhesive, laminating the PET film to the other face and drying. An anti-glare processing may be previously applied to the PET film coming to a viewing side of the display device. (C) Step of Laminating Release Film (Separator) and Protection Film. The separator is laminated to the TAC film surface of the polarizing plate via a strong pressure-sensitive adhesive layer, and the surface protecting film is laminated to the PET film surface via a weak pressure-sensitive adhesive layer. In this case, the strong pressure-sensitive adhesive layer is previously coated on the separator, and the weak pressure-sensitive adhesive layer is coated on the surface protecting film. The strong pressure-sensitive adhesive layer coated on the separator is transferred to the TAC film after peeling off the separator. Further, the weak pressure-sensitive adhesive layer coated on the surface protecting film keeps being formed on the surface protecting film even after peeling off the surface protecting film, and is not substantially transferred to the PET film. In the previous step mentioned above, the long sheet material is produced, is wound as a roll shape, and is provided to the later step.

In the previous steps (A, B, C), a predetermined inspection is carried out by an inspector per each step. For example, in the case of the step (A), the inspector checks out the defect (the contaminant, the dirty, the torsion and the like) by a visual observation, in step of the feeding of the PVA material. Further, in the case of the step (B), the inspector checks out the defect (the contaminant, the dirty, the knick, the torsion, the kink and the like) at timings of the winding start and the winding end by a visual observation, at a time of winding the obtained polarizing plate material in the roll shape. Further, the polarizing plate material after being laminated is automatically inspected by the inspecting apparatus (the known apparatus for determining the defect by photographing the contaminant, the dirty and the like by the camera and image processing), and the defect is conformed by the monitor.

Further, in the case of the step (C), the inspector carries out a grading (non-defective, defective, propriety of shipment) of the sheet material by checking out the defect (the contaminant, the dirty, the torsion and the like) at timings of the winding start and the winding end by the visual observation, at a time of winding the obtained long sheet material in the roll shape, and evaluating the defect.

Next, (D) Slit Step of Material roll, as a post step. Since the material roll is wide, the material roll is slit into a predetermined size in conformity to the size of the optical display device corresponding to the final product. The slit step is omitted in some width of the material roll. Next, (E) Inspecting Step of Material roll. In this case, the visual observation inspection is carried out by a roll type automatic inspecting apparatus and/or the inspector, as an outer appearance inspection of the long sheet material. The roll type automatic inspecting apparatus is a known apparatus for determining the defect by photographing a winding fault, an outer appearance defect and the like by a camera, and image processing.

In the steps mentioned above, the produced material roll is put into a package and is shipped to the next step place. On the other hand, in the case that the bonding step to the optical display unit is carried out in the same place, it is fed to the next step in a simplified package or an untouched state.

The optical display device produced by the present invention can be applied to an image display device such as a liquid crystal display device, an organic EL display device, a PDP and the like.

The liquid crystal display device can be formed in accordance with the conventional way. In other words, the liquid crystal display device is generally formed by appropriately assembling component parts such as a liquid crystal cell (corresponding to the optical display unit), an optical film and a lighting system as occasion demands and installing a driving circuit, however, the forming way is not particularly limited in the present invention except a point that the optical film is used, and can be based on the conventional way. With regard to the liquid crystal cell, it is possible to use an optional type, for example, TN type, STN type, $\pi$ type and the like.

It is possible to form an appropriate liquid crystal display device such as a liquid crystal display device in which the optical film is arranged in one side or both sides of the liquid crystal cell, one in which a backlight or a reflector is used in the lighting system, and the like. In this case, the optical film can be placed in one side or both sides of the liquid crystal cell. In the case that the optical film is provided in both sides, they may be the same or may be different. Further, at a time of forming the liquid crystal display device, it is possible to arrange appropriate parts, for example, a diffusion plate, an anti-glare layer, a anti-reflection film, a protective plate, a prism array, a lens array sheet, a light diffusion plate, a backlight and the like at appropriate positions in one layer or two layers or more.

The liquid crystal display device can be formed as a device having an appropriate structure based on conventional transmitting type, reflecting type or transmitting and reflecting both-way type in which the optical film is arranged in one side or both sides of the liquid crystal cell. Accordingly, the liquid crystal cell forming the liquid crystal display device is optional, for example, it is possible to use an appropriate type of liquid crystal cell such as an active matrix drive type represented by a thin film transistor type.

Further, in the case that the polarizing plate or the optical member is provided in both sides of the liquid crystal cell, they may be the same or may be different. Further, at a time of forming the liquid crystal display device, it is possible to arrange appropriate parts, for example, a prism array sheet, a lens array sheet, a light diffusion plate, a backlight and the like at appropriate positions in one layer or two layers or more.

What is claimed is:

1. A production management system applied to an optical display device production system for producing an optical display device by unwinding an optical film from a material roll formed by winding the optical film in a roll shape, and cutting into a predetermined size so as to bond to an optical display unit, comprising:
- a material roll production management apparatus managing a production of the material roll; and
- an optical display device production management apparatus managing a production of the optical display device in the optical display device production system,
- wherein the optical display device production management apparatus includes:
- an information storage portion storing a panel information allocated per the optical display unit, and a roll information including a positional information of the optical film in the material roll before the optical film bonded to the optical display unit is cut so as to coordinate the panel information and the roll information; and
- a position specifying portion specifying a position in the material roll before the optical film of the optical display device is cut, based on a result of inspection of the optical display device to which the optical films have been bonded with the optical display device production system, the panel information and the roll information.

2. The production management system applied to an optical display device production system according to claim 1, wherein the material roll production management apparatus has a defect information transmitting portion transmitting a defect information including a positional information of a defect in the produced material roll to the optical display device production management apparatus.

3. The production management system applied to an optical display device production system according to claim 1, wherein the optical display device production management apparatus has a roll information transmitting portion transmitting a roll information stored in the information storage portion to the material roll production management apparatus based on the result of inspection.

4. The production management system applied to an optical display device production system according to claim 1, wherein the optical display device production management apparatus has a yield information transmitting portion transmitting a yield information of the optical display device produced by the optical display device production system to the material roll production management apparatus.

5. A production management method applied to an optical display device production system for producing an optical display device by unwinding an optical film from a material roll formed by winding the optical film in a roll shape, and cutting into a predetermined size so as to bond to an optical display unit, comprising:
- an information storing step in which an optical display device production management apparatus managing a production of the optical display device in the optical display device production system stores a panel information allocated per the optical display unit, and a roll information including a positional information of the optical film in the material roll before the optical film bonded to the optical display unit is cut so as to coordinate the panel information and the roll information; and
- a position specifying step in which the optical display device production management apparatus specifies a position in the material roll before the optical film of the optical display device is cut, based on a result of inspection of the optical display device to which the optical films have been bonded with the optical display device production system, the panel information and the roll information.

6. The production management method applied to an optical display device production system according to claim 5, comprising:
- a defect information transmitting step in which the material roll production management apparatus managing the production of the material roll transmits a defect information including a positional information of a defect in the produced material roll to the optical display device production management apparatus.

7. The production management method applied to an optical display device production system according to claim 5, comprising:
- a roll information transmitting step in which the optical display device production management apparatus transmits a roll information stored in the information storing step to the material roll production management apparatus based on the result of inspection.

8. The production management method applied to an optical display device production system according to claim 5, comprising:
- a yield information transmitting step in which the optical display device production management apparatus transmits a yield information of the optical display device produced by the optical display device production system to the material roll production management apparatus.

* * * * *